US012755513B1

(12) United States Patent
Li et al.

(10) Patent No.: US 12,755,513 B1
(45) Date of Patent: Oct. 6, 2026

(54) NON-PRODUCT DETECTION IN SMART SHOPPING CARTS

(71) Applicant: Amazon Technologies, Inc., Seattle, WA (US)

(72) Inventors: Weijian Li, Alexandria, VA (US); Yin Wang, Quincy, MA (US); Shun Miao, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 18/541,955

(22) Filed: Dec. 15, 2023

(51) Int. Cl.
*G06V 10/00* (2022.01)
*G06F 40/40* (2020.01)
*G06V 10/764* (2022.01)

(52) U.S. Cl.
CPC ............ *G06V 10/764* (2022.01); *G06F 40/40* (2020.01); *G06V 2201/10* (2022.01)

(58) Field of Classification Search
CPC ............ G06N 3/02; G06N 3/08; G06N 3/042; G06N 3/045; G06N 3/047; G06N 3/082; G06N 3/088; G06N 3/092; G06N 3/0454; G06N 3/0475; G06N 3/0464; G06V 10/82; G06V 10/85; G06V 10/25; G06V 10/761; G06V 10/762; G06V 10/764; G06V 10/765; G06V 10/7715; G06V 2201/10; G06F 40/40
See application file for complete search history.

(56) References Cited

U.S. PATENT DOCUMENTS

| | | | | |
|---|---|---|---|---|
| 10,769,198 | B1 * | 9/2020 | Tsai | G06Q 30/0625 |
| 10,949,460 | B2 * | 3/2021 | Li | G06F 16/51 |
| 11,361,557 | B2 * | 6/2022 | Lee | G06V 20/584 |
| 11,693,901 | B2 * | 7/2023 | Gorban | G06V 20/38<br>382/103 |
| 11,727,605 | B2 * | 8/2023 | Cho | G06F 18/2431<br>345/646 |
| 11,804,035 | B2 * | 10/2023 | Kale | G06Q 30/0629 |
| 11,966,436 | B2 * | 4/2024 | Hughes | G06N 3/045 |
| 12,130,891 | B2 * | 10/2024 | Ye | G06V 20/46 |
| 12,154,117 | B2 * | 11/2024 | Das | G06Q 30/016 |
| 2023/0316557 | A1 * | 10/2023 | Steiner | H04N 7/181<br>348/159 |
| 2024/0355022 | A1 * | 10/2024 | Shi | G06T 9/00 |

OTHER PUBLICATIONS

Heinonen et al., "WO 2020016482 A2, computation of user specific item related values on an electronic processing platform".; date published Jan. 23, 2020.*

* cited by examiner

*Primary Examiner* — Amir Alavi
(74) *Attorney, Agent, or Firm* — Kilpatrick Townsend & Stockton LLP

(57) ABSTRACT

This disclosure describes, in part, systems and methods enabling non-product detection using a dual-pathway model. Images can be collected of non-product items, such as by using a shopping cart equipped with a basket facing camera or other mobile apparatus. A registration status of a user can be determined. The product images can be analyzed to determine whether the non-product item matches a registered non-product item. The product images can be analyzed to determine whether the non-product item matches a category of a group of non-product items for a particular store.

19 Claims, 8 Drawing Sheets

NON-PRODUCT DETECTION IN SMART SHOPPING CARTS

BACKGROUND

Traditional physical stores maintain an inventory of items in customer-accessible areas such that customers can pick items from the inventory, place them in a shopping cart, and take them to a cashier for purchase, rental, and so forth. In addition to items sold by the store, customers may place personal items into the shopping cart (e.g., non-product item(s)). For example, a customer may place a mobile device, a bag, a wallet, etc. into the shopping cart. There has been a growing interest in applying artificial intelligence (AI) towards improving the retail shopping experience. This is exemplified by recent innovations in the smart shopping cart space such as Amazon's Dash Cart. One feature offered by these shopping carts is the ability to scan and add products on-the-go, while alerting a customer when a non-product is placed in the smart shopping cart.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
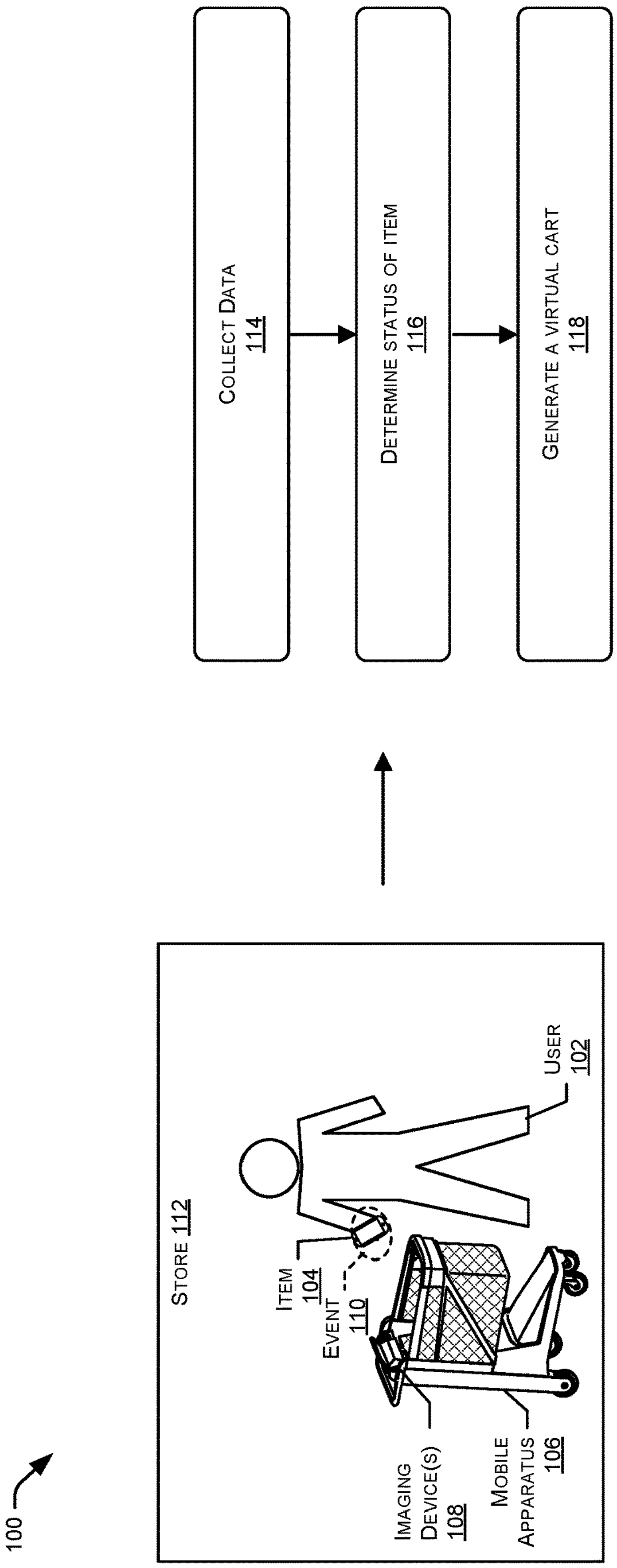
FIG. 1 an example environment, where a system may perform non-product detection of items in relation to a mobile apparatus of a store, according to at least one example.

Smart shopping carts provide opportunities to scan and add products on the go without requiring a manual checkout process as in a traditional store. In addition to products sold by the store, customers may place items into the smart shopping cart that are non-products (e.g., personal items).

Traditional product recognition systems produce alarms to unresolvable items, e.g., personal items. For example, once a personal item is placed into the smart shopping cart, an alarm may be triggered that requests the shopper or associates to fix the problem. Moreover, when an alarm is triggered, the smart shopping cart may display a request to the shopper, asking the shopper to identify the item as a personal item or not. In traditional product recognition systems, we generally accept whatever the shopper says the item is (e.g., personal item or product), which can result in fraud/theft.

However, triggering alarms every time a personal item is placed into the smart shopping cart can cause a cumbersome shopping experience. Moreover, the triggering of alarms leads to increased shopping event audit rates, store assistant efforts, resulting in increased costs to the store and negatively impacting customer shopping experience. Additionally, in traditional product recognition systems, we generally accept whatever the shopper says the item is (e.g., personal item or product), which can result in fraud and theft.

One solution is Non-product Detection (NPD). NPD is used to determine whether the item put into the shopping cart basket is a non-product (e.g., a personal item) carried by the customer instead of a product sold by the store. NPD is the fundamental and gatekeeper component for the smart shopping cart to reduce APK (Assist Per 1000 Usage) and EPK (Errors Per 1000 Usage), to improve customer shopping experience, and to reduce fraud and abuse rates.

However, NPD is required to have very high True Positive Rate (TPR) and very low False Positive Rate (FPR) to correctly detect all personal items as well as products sold by the store to allow normal personal items go into the basket not triggering assistance, while maintain high accuracy to recognize products goes into the basket to reduce shrinkage. Moreover, NPD is also challenging across various different stores where the boundary of non-product and product definitions could be ambiguous. For example, different stores could sell different kinds of products, and different customers could carry different kinds of personal items. The same kind of item could be sold in the store, as well as a possess of the customer.

Accordingly, traditional product recognition systems do not contain non-product detection capabilities, much less non-product detection capabilities that can be applied to different stores selling different products.

There is therefore a need for techniques to address the problem of enabling smart shopping carts to implement enhanced non-product detection and recognition, without triggering continuous alerts to a customer, and while offering flexibility for different store locations.

This disclosure describes, in part, systems and methods to providing enhanced non-product detection using a dual-path approach. In particular, this description relates to one or more systems that may be implemented on a mobile apparatus (e.g., a shopping cart) within a facility, server(s) of the facility, and/or remotely located server(s). In some examples, the mobile apparatus may be equipped with imaging device(s) (e.g., camera(s), sensor(s), etc.).

The disclosed systems may receive a first sequence of images of an item. For example, the first sequence of images may be received in response to an event detected during a shopping session. In some examples, the event may correspond to a user (e.g., a customer, shopper, etc.) placing an item into the cart. In some examples, the shopping session associated with a user identifier of the user. For instance, when a user begins a shopping session, the session may be associated with the user identified in a database of the cart and/or store. In some examples, the user identifier is associated with a user account of the user.

The system may determine whether the first sequence of images depict a product of the store. For example, the system may perform product identification, where an item is placed into the cart during a shopping session. Where the system determines the first sequence of images do not depict a product, the system may indicate the item corresponds to a non-product item.

In some examples, the system may determine a registration status associated with the user identifier. For examples, prior to or at the start of the session, the system may enable the user to register one or more personal items as non-product items. As used herein, a "personal item" or a "non-product item" refers to any item a customer may have that is not a product of the store or any item that the customer has previously purchased from the store. For instance, the cart may display a request via a user interface, providing the user the option to register any personal items. In some examples, the user may dismiss or deny the request and the session may begin without the user registering any personal items.

In some examples, the user may accept the option to register a personal item as a non-product item and may place the personal item (e.g., a wallet, a purse, a hat, etc.) into the cart. The cart may capture a sequence of images of the personal item. The system may apply a multimodal vision and vision model to the sequence of images to generate image features correspond to each of the images. The system may store the sequence of images and the corresponding features in a database associated with the cart and/or the store as a registered non-product item. The registered non-product item (e.g., the sequence of images and the corresponding features) may be associated with the user identifier. In some examples, the registered non-product item is stored in association with the user identifier for the duration of the session. In some examples, the registered non-product item is stored in association with the user identifier after the session ends, such that the registered non-product item can be referenced during future sessions of the user.

As used herein a "multimodal vision and vision model" refers to using an image encoder of the multimodal vision and language models described below. For example, some embodiments of this disclosure can use multimodal vision and vision models that embed two or more sequences of images and input them into vectors. As a result, similar images produce more similar embeddings.

In a first example, such as where the system determines one or more personal items are registered in association with the user identifier, the system may provide a registration-based pathway for non-product detection. In some examples, the system may determine whether the non-product item of the first sequence of images matches a registered non-product item associated with the user identifier. For example, the system may access the second sequence of images of the registered non-product item from a database of the cart or the store. In some examples, the second sequence of images may be stored as a personal gallery associated with the user identifier. In some examples, the system may access the features associated with the second sequence of images.

The system may determine similarity of the first sequence of images to the second sequence of images, wherein the similarity is based on generating respective similarity scores for each respective image in the first sequence of images and respective features for each of the images in the second sequence of images. For instance, the system may apply the multimodal vision and vision model to the first sequence of images to generate additional image features correspond to each of the images. The system may generate similarity scores based on comparing the features of the second sequence of images and the additional features of the first sequence of images.

Based on the similarity scores, the system may determine that the first sequence of images matches the registered non-product item. For instance, the system may compare the similarity scores to a threshold (e.g., 0.5 or any suitable threshold). Where at least one of the similarity scores is above the threshold, the system may determine that the non-product item matches the registered non-product item. In some examples, the system may determine a representative score of the similarity scores. For instance, the representative score may correspond to a mean score, a maximum score, etc. The system may compare the representative score to the threshold to determine whether the non-product item matches the registered non-product item.

In some examples, the system may store an indication that the non-product item matches the registered non-product item. For instance, the indication may be stored in association with the user identifier. Accordingly, after the user registers a personal item, the system may seamlessly and accurately detect that an item placed into the cart during the session matches the registered non-product item without generating an alert to the user or requiring additional input. This provides an improved and personalized user experience and enables a true unobservable non-product detection experience.

In a second example, such as where the system determines that no personal items are registered in association with the user identifier, the system may provide a category-based pathway for non-product detection. In some examples, the system may determine whether the non-product item matches a non-product category of a group of non-product categories for the store. In some examples, each non-product category in the group of non-product categories corresponds to common non-product categories, such as hats, keys, shopping bags, paper bags, smartphones, wallets, or any other suitable category. In some examples, the group of non-product categories may be pre-defined by the system and customized for the store based on what products the store sells. For instance, where a particular store sells wallets as a product, the system may exclude wallets from the group of non-product categories for that particular store.

The system may retrieve the group of pre-defined non-product categories of the non-product items. For instance, the group of non-product categories may be stored in a database associated with the cart and/or store. The system may access the database to retrieve the group of non-product categories and corresponding features. In some examples, each of the non-product categories are associated with images depicting items within the non-product category. In some examples, each non-product category comprises features associated with the category. For instance, the system may apply a multimodal vision and language model to the images and the non-product categories, such that language features corresponding to each of the non-product categories are extracted and stored in the system. In some examples, the language features may be used to classify an item as a non-product or product.

The system may determine, for each of the non-product categories, a respective matching image of the first sequence of images of the non-product item, wherein the determining generates respective scores for each of the images in the first sequence of images and the respective non-product categories. In some examples, the system matches the non-product categories to a respective image by applying a multimodal vision and language model that embeds both input images and text and converts them into vectors. In some examples, system may generate the similarity scores based on the image features and corresponding language weights.

Based on the respective scores, the system may determine that the non-product item matches one of the non-product categories. For instance, the system may compare the similarity scores to a threshold (e.g., 0.5 or any suitable threshold). Where at least one of the similarity scores is above the threshold, the system may determine that the non-product item matches at least one of the group of non-product categories. In some examples, the system may determine a representative score of the similarity scores. For instance, the representative score may correspond to a mean score, a maximum score, etc. The system may compare the representative score to the threshold to determine whether the non-product item matches at least one of the non-product categories. In some examples, the system may store an indication that the item matches a non-product category for the duration of the session. Thus, the system does not generate an alert based on detecting a non-product item.

Based on the respective scores, the system may determine that the non-product item does not match one of the non-product categories. For instance, the similarity scores or the representative score is equal to or below the threshold, the system may determine that the non-product item does not match a non-product category. In this example, the system may generate an alert requesting the user identify the item as a product or a personal item. Where the user indicates the item is a personal item, the system may determine whether the item is similar to a product being sold by the store. In some examples, such as where the system determines the store does not sell a similar product, the system may register the item as a registered non-product item as described above. In some examples, such as where the item corresponds to a hat and the system determines the store is selling a similar hat, the system may refrain from registering the item as a non-product item. The system may continue to monitor the item and the shopping cart to determine whether the item is the personal item or not. For instance, the system may make a determination based on heuristic data (e.g., number of times the item is placed in the cart and removed from the cart, the number of copies of the item in the cart, a time the item is added to the cart, a location, and/or any other suitable data). Where the system determines, based on the heuristic data, that the item is a personal item, the system may register the item as the non-product item as described above. Where the system determines that the heuristic data indicates the item is not a personal item (e.g., the item is a product), the system may perform one or more actions (e.g., generating an alert to the user, request input associated with the item, generating an alert to store personnel, requiring assistance at checkout, initiating another workflow, etc.). Accordingly, the system may provide enhanced security and prevent fraud and loss in stores. In contrast, traditional systems provide no additional checks when a shopper indicates an item is a personal item, such that fraud and theft can easily occur.

Accordingly, this disclosure provides a dual-path non-product detection approach to provide enhanced coverage of non-product detection and recognition in smart shopping carts and stores. The system allows shoppers to register their personal items at any time of a shopping session. The system provides an additional ability to capture common non-products during the entire shopping session even the shoppers did not register a personal item. This allows for flexible shopping behaviors and enables customers to have a true unobservable non-product detection experience.

Some embodiments of this disclosure can use multimodal vision and language models that embed both input images and text and converts them into vectors. There are multiple existing multimodal vision and language models that can be adapted for use with the present disclosure. Examples include the Contrastive Language-Image Pretraining (CLIP) model, the Foundational Language And Vision Alignment (FLAVA) model, the Generative Image-to-text Transformer (GIT) model, the BridgeTower model, the GroupViT model, the Bootstrapping Language-Image Pre-training (BLIP) model, the Vision Transformer for Open-World Localization (OWL-ViT) model, the CLIPSeg model, the X-CLIP model, the VisualBERT model, the Vision-and-Language Transformer (ViLT) model, the Zero-Shot Transfer with Locked-image Text Tuning (LiT) model, the Transformer-based Optical Character Recognition (TrOCR) model, the Vision-TextDualEncoder model, and the VisionEncoderDecoder model. Some multimodal vision and language models can make use of a contrastive loss function during training to push apart embeddings that are not related and pulls together embeddings that are related.

As a result, similar images and text that describe those images produce more similar embeddings. Example models can be trained on image-caption pairs found on, e.g., publicly available sources resulting in highly expressive models that can perform zero-shot learning on a variety of classification tasks. An example dataset can comprise, e.g., up to 400 million or more image-caption samples.

One way to apply a model for the use cases described herein is in a "classification mode" in which embeddings for a given input image are extracted using the image encoder model of model and its similarity score is computed against text embeddings of all predefined non-product category texts extracted from the text encoder model. However, forcing each image in the database to fall in one of the text categories can lead to false positives (FP) because these scores are relative amongst the categories detected in an image and it can be difficult to threshold these scores effectively to avoid poor matches. An input image captured from a moving camera can have many defects as motion blur, occluded views of an item, multiple types of products in the same image etc., and these can contribute to false positives.

Therefore, rather than finding a best matching category for a given image, which is prone to false positives, other embodiments can instead query for the image that yields the highest matching score for a given category. This approach reduces likelihood of false matches because as long as there is even a single high-quality image of a given category, that image is likely to get the highest matching score.

The systems and techniques described herein provide for improvements over conventional approaches by enabling each of the dual-pathways to be used individually or in combination, thereby providing accurate and versatile non-product detection that covers common non-product categories to reduce false alarms during the shopping session, and at the meantime, providing automation for personalized non-product item recognition that are not defined by our system to ensure improved user experience.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100, where a system may perform non-product detection of items 104 in relation to a mobile apparatus 106 of a store 112, according to at least one example.

The mobile apparatus 106 (also referred to as "mobile apparatus 106" or "mobile apparatus 106" herein) can include, inter alia, imaging device(s) 108, such as cameras that can capture images, such as the images. In some examples, the mobile apparatus 106 can further include sensor(s) configured to detect an event 110. In some examples, an event 110 may comprise detecting an item has been placed in the mobile apparatus 106 or that an item 104 is removed from the mobile apparatus 106. In some examples, an event 110 may occur during a session with the user 102. In some examples, the mobile apparatus 106 can include a product identification system enabling product purchase, product scanning, and/or product information display at the mobile apparatus 106, and a positioning system that identifies a location of the mobile apparatus 106 within the store 112. In some examples, the mobile apparatus 106 can further include a non-product identification system enabling detection of non-product items placed into the mobile apparatus 106 by a user 102. The mobile apparatus 106 can further include a display and/or other user interfaces for a user to input and receive information regarding items 104 (product or non-product items) during a shopping session.

In some examples, the store 112 may comprise networking/communications equipment (not shown in FIG. 1) adapted to communicate with the mobile apparatus 106, to thereby enable communications between the mobile apparatus 106 and store 112 servers and electronics.

At 114, the system may collect data. For example, a mobile apparatus 106 can collect a sequence of images. The sequence of images may be generated using imaging device(s) 108. The sequence of images may be generated in response to an event 110 (e.g., addition of an item 104 to the cart, removal of an item 104 from the cart, etc.). In some examples, the sequence of images may correspond to products in a store 112 or other facility. The mobile apparatus 106 can further collect image location information associated with the sequence of images. The mobile apparatus 106 can send the collected data to a server of the store 112, such that the server may identify product items and/or non-product items based on the sequence of images. In some examples, the mobile apparatus 106 can perform product detection and/or non-product detection locally.

At 116, the system may determine the status of an item 104. For instance, the system may determine whether the item 104 is a product item of the store 112 or a non-product item. In some examples, steps 114 and 116 may occur simultaneously.

In some examples, the system may determine whether the item is a product of the store using a product identification system. For instance, the system may process the sequence of images to generate image data. In some examples, the system may process the sequence of images by applying one or more models to the sequence of images. The system may determine whether there is an item identifier for the item(s) represented in the image data. The system may determine an item identifier for the item 104 (e.g., name of the item 104, SKU number for the item 104, non-product classification, or product classification, etc.), and determine if the item 104 is being taken from the mobile apparatus 106, or added to the mobile apparatus 106, based on the motion of the item 104 and the result of the movement around the mobile apparatus 106 once movement is no longer detected and represented by the image data. In some examples, the system may process the sequence of images by applying one or more models to the sequence of images. Where the system determines the item 104 has a non-product classification, the system may perform non-product detection and identification using the techniques described herein.

At 118, the system may generate a virtual cart. For instance, the virtual cart can be associated with the mobile apparatus 106 and may be generated at the start of a session with the user 102 and may be maintained for the duration of the shopping session of the user 102. In some examples, the virtual cart may store a virtual listing of item(s) 104 that are product items associated with the store 112 that the user 102 places into the mobile apparatus 106 for purchase.

Where the system determines the item 104 in the sequence of images corresponds to a product item, the system may update a virtual shopping cart associated with the mobile apparatus 106 that indicates a virtual listing of items taken by the user 102 from the store 112 based on the determined event 110. Where the system determines that the item 104 corresponds to a non-product item 104, the system may store an indication of the non-product item in association with the session of the user 102 and may refrain from adding the item 104 to the virtual cart.

In some examples, the product identification system can be adapted to collect and record product identification information of products placed inside the mobile apparatus 106, in order to facilitate purchase of products. The product identification system can optionally accept and process payments, or can communicate with other payment processing equipment, e.g., upon checkout. For instance, after the user 102 has ended their shopping session, the list of item identifiers in the virtual shopping cart may be uploaded to one or more remote servers, over one or more networks, that manage user accounts for users 102 of the store 112. The server(s) may charge the appropriate user account for the listing of the items in the virtual shopping cart that the user 102 took from the store 112. For instance, the server(s) may be configured to determine or generate information indicative of a cost of the items picked by the user 102. Additionally, the server(s) may store payment information (e.g., credit card information, bank account information, etc.) for each user account. In this way, when the user 102 finished their shopping session and the mobile apparatus 106 sends the listing of item identifiers in the virtual shopping cart over the network(s) to the server(s), the server(s) may be configured to determine a cost or price for all of the listed item identifiers, and charge the user via their payment information for the items selected during their shopping session. In this way, the user 102 need not go through steps of a traditional check-out experience (e.g., waiting in line for a cashier, scanning items with the cashier, paying for items at the cashier, etc.).

Figure 2A:
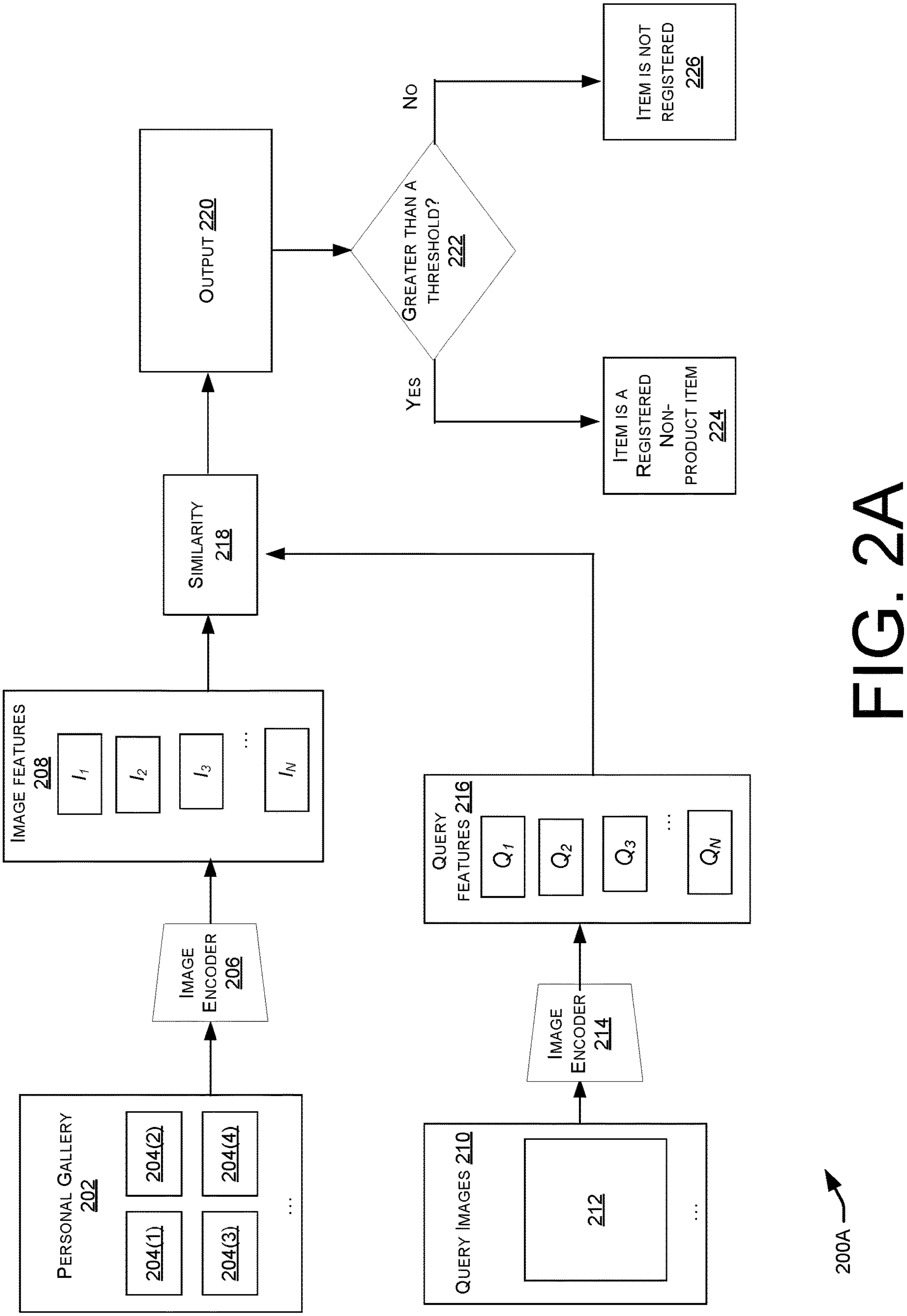
FIGS. 2A and 2B illustrate example operations that can be performed in connection with non-product detection, according to at least one example.

FIG. 2A illustrates example operations that can be performed by a system in connection with connection with non-product detection using a dual-pathway model. In particular, the example operations correspond to a registration-based pathway. The system 200A according to FIG. 2A can be applied by registration engine 538 of FIG. 5 and/or registration component 724 of FIG. 7, in some embodiments. In some examples, one or more of the operations of FIG. 2A can be used in combination with one or more of the operations of FIG. 2B below. In some examples, the operations of FIG. 2A are optionally performed, such as when the system determines a user has registered a personal item at the beginning of or during a session. In some cases, such as where a user has not registered a personal item, one or more of the operations of FIG. 2A may not be performed.

In FIG. 2A, the system 200A may receive a personal gallery 202 that may correspond to a database. The personal gallery 202 can comprise item images collected from a mobile apparatus 106. The personal gallery 202 includes example images 204(1)-204 (4) (referred to collectively as "images 204") and can further include additional images. In some examples, the personal gallery 202 corresponds to images captured by the mobile apparatus 106 in response to a user 102 registering an item 104 at the beginning of a shopping session. Accordingly, example images 204(1)-204 (4) may comprise a sequence of images depicting the item 104 being registered as a non-product item by the user 102.

The system 200A can process the images 204 with an image encoder 206 portion of a multimodal vision and language model in order to obtain text embeddings from the images 204. The output of the image encoder 206 comprises image features 208 corresponding to text enhanced images $I_1$, $I_2$, $I_3$, . . . $I_N$. The system 200A may store the image features 208 in association with the registered non-product item and images 204, such as in a database of the store 112 or memory of the mobile apparatus 106.

The system 200A can receive query images 210. Query images 210 can comprise item images collected in response to an event associated with a mobile apparatus 106 (e.g., such as the user 102 placing an item 104 into the mobile apparatus 106 that is determined to be a non-product item). Query images 210 includes example image 212 and can further include additional images. In some examples, the query images 210 comprise a sequence of images.

The system 200A can process the query images 210 with an image encoder 214 portion of a multimodal vision and language model in order to obtain text embeddings from the query images 210. In some examples, the image encoder 214 comprises a same image encoder as image encoder 206. In some examples, the image encoder 214 comprises a different image encoder as image encoder 206. The output of the image encoder 214 comprises query features 216 corresponding to text enhanced images $Q_1$, $Q_2$, $Q_3$, . . . $Q_N$.

The system 200A may determine similarity 218 of the query features 216 and the image features 208. For instance, the system 200A may retrieve the image features 208 of a registered non-product item from memory and compare them to the query features 216 of the non-product item.

The system 200A can provide output 220. The output 220 can comprise one or more similarity scores between the image features 208 and query features 216. For example, the system 200A may provide output indicating that image feature $I_1$ and query feature $Q_1$ have a similarity score of 0.6.

The system 200A may determine whether the output 220 is greater than a threshold 222. For instance, the system 200A may compare each of the similarity scores output 220 to a threshold value. In some examples, the threshold 222 may correspond to 0.5, or any other suitable threshold value. In some examples, the system 200A may compare a representative score to the threshold 222. The representative score may correspond to a mean score, maximum score, etc. of the similarity scores output 220 by the system 200A.

Figure 2B:
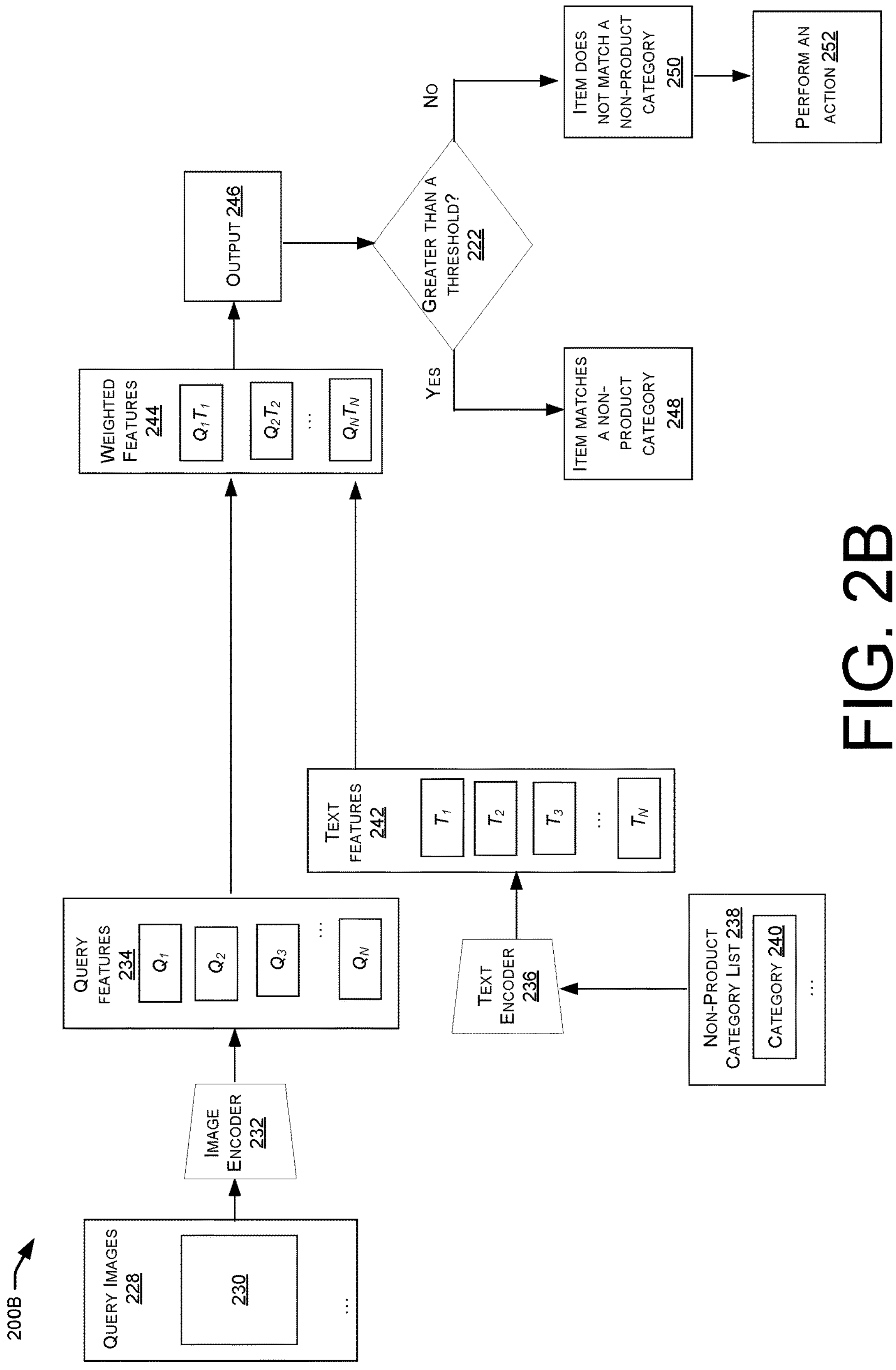

In some examples, the system 200A may combine the similarity scores of output 220 and the similarity scores of output 246 from system 200B of FIG. 2B to determine whether an item is a non-product item. In this example, both output 220 and output 246 are compared to the threshold 222. In some examples, a representative score may be determined using output 220 and output 246.

Where is the system 200A determines that the output 220 is greater than the threshold 222, the system 200A determines the item matches a registered non-product item 224. In this example, the system 200A may store an indication of the item as matching a registered non-product item in memory or a database of the store 112 in association with a user identifier of the user 102.

Where is the system 200A determines that the output 220 is greater than the threshold 222, the system 200A determines the item does not match a registered non-product item 226. In this example, the system 200A may generate an alert for the user 102 or perform one or more operations described in the system 200B of FIG. 2B.

FIG. 2B illustrates example operations that can be performed by a system 200B in connection with connection with non-product detection using a dual-pathway model. In particular, the example operations correspond to a category-based pathway. In some examples, the system 200B may be performed following the operations of FIG. 2A above. In some examples, the operations of system 200B may be performed independently of the operations of FIG. 2A, such as where a user 102 has not registered a personal item and/or an item is placed into a mobile apparatus 106 during a shopping session does not match a registered non-product item of the user 102. In some examples, one or more operations of FIG. 2B may be performed at the same time as one or more operations of FIG. 2A.

In FIG. 2B, the system 200B can receive query images 228. Query images 230 can comprise item images collected in response to an event associated with a mobile apparatus 106 during a shopping session (e.g., such as the user 102 placing an item 104 into the mobile apparatus 106 that is determined to be a non-product item). Query images 228 includes example image 230 and can further include additional images. In some examples, the query images 228 comprise a sequence of images of the non-product item.

The system 200B can process the query images 228 with an image encoder 232 portion of a multimodal vision and language model in order to obtain text embeddings from the query images 228. In some examples, the image encoder 232 comprises a same image encoder as image encoders 206 and 214 of FIG. 2A. In some examples, the image encoder 232 comprises a different image encoder as image encoders 206 and 214. The output of the image encoder 232 comprises query features 234 corresponding to text enhanced images $Q_1$, $Q_2$, $Q_3$, . . . $Q_N$.

The system 200B can process non-product category list 238 and the query features 234 with a text encoder 236 portion of a multimodal vision and language model to thereby obtain text embeddings (illustrated as text features 242) for the non-product categories 240. For example, the text encoder 236 can be used to process category 240 to output text features 242. The text features 242 are used, in addition to query features 234, to generate weighted features 244. In a non-product context, text features 242 (e.g., $T_2$, etc.) may comprise, e.g., "wallet" or another descriptive text. The system 200B can then compare the text features 242 against the text enhanced images $Q_1$, $Q_2$, $Q_3$, . . . $Q_N$ to generate weighted features 244 (e.g., $Q_1T_1$, $Q_2T_2$, . . . . $Q_NT_N$). The closest matches (e.g., the top five closest matches, or any other suitable number of matches) can be computed and output as weighted features 244.

The system 200B may output 246 similarity scores for each of weighted features 244 and/or the closest matches. For example, the system 200B may provide output indicating that $Q_1T_1$ has a similarity score of 0.6. In some examples, the system 200B output a representative score.

The representative score may correspond to a mean score, maximum score, etc. of the similarity scores output 246 by the system 200B.

The system 200B may determine whether the output 246 is greater than a threshold 222. For instance, the threshold 222 of system 200A and system 200B may correspond to the same threshold value. In some examples, the system 200B may compare the representative score to the threshold 222.

In some examples, the system 200B may combine the similarity scores of output 220 from system 200A and the similarity scores of output 246 to determine whether an item is a non-product item. In this example, both output 220 and output 246 are compared to the threshold 222. In some examples, a representative score may be determined using output 220 and output 246.

At 248, the system 200B determines that the output 246 is greater than the threshold 222. In this example, the system 200B determines the item matches a category 240 of the non-product category list 238. In this example, the system 200B may store an indication of the item as matching the category 240 in memory or a database of the store 112 in association with a user identifier of the user 102.

At 250, the system 200B determines that the output 246 is equal to or less than the threshold 222. In this example, the system 200B determines the item does not match a category 240 of the non-product category list 238. In this example, the system 200B may perform an action 252. For instance, the system 200B may generate and display an alert for the user 102 requesting input associated with item, send an alert to a store associate, perform an audit, continue monitoring the item and heuristic data associated with the item, etc.

Figure 3:
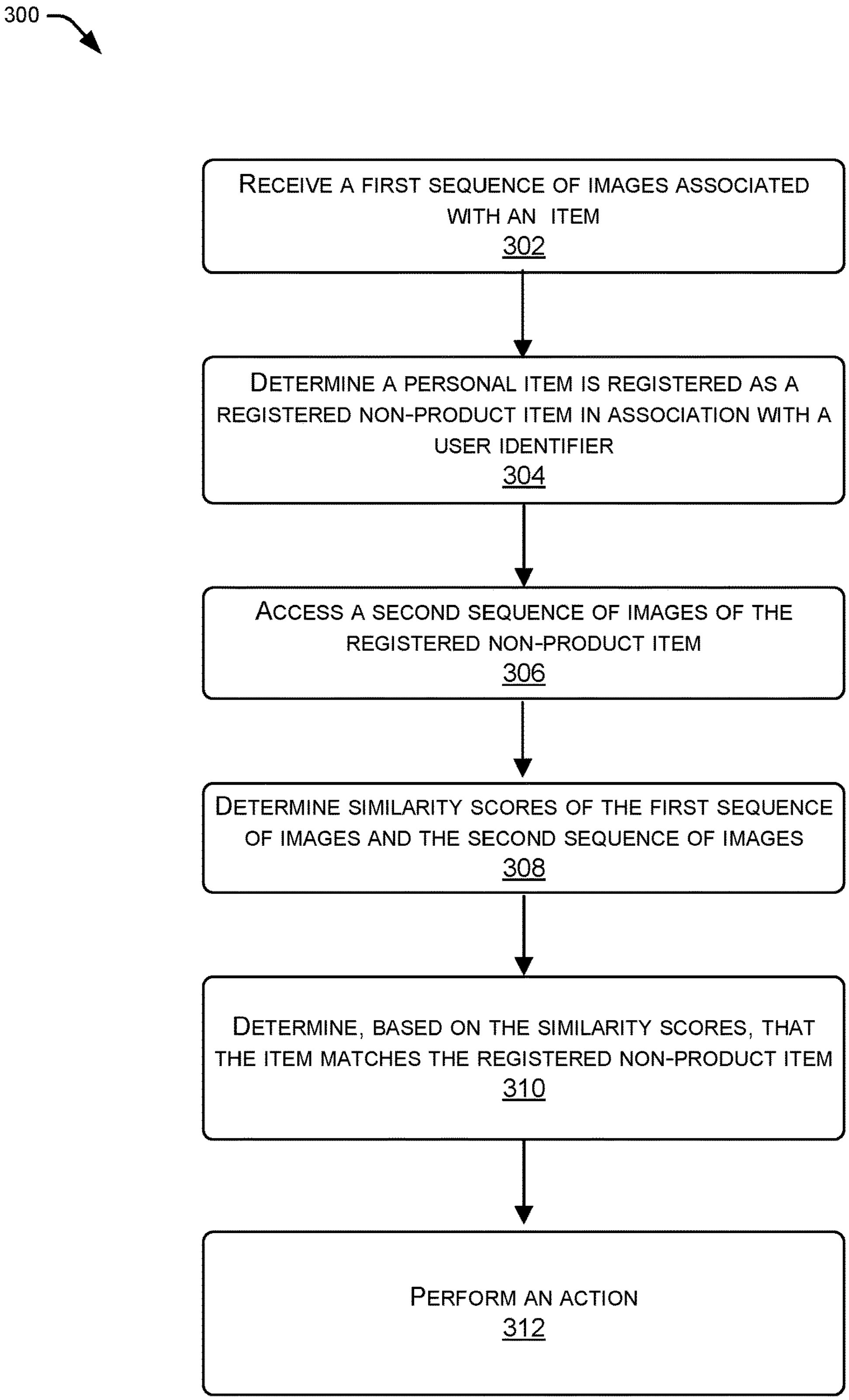
FIG. 3 illustrates an example process that can be performed in connection with non-product detection using a dual-pathway model, according to at least one example.
Figure 4:
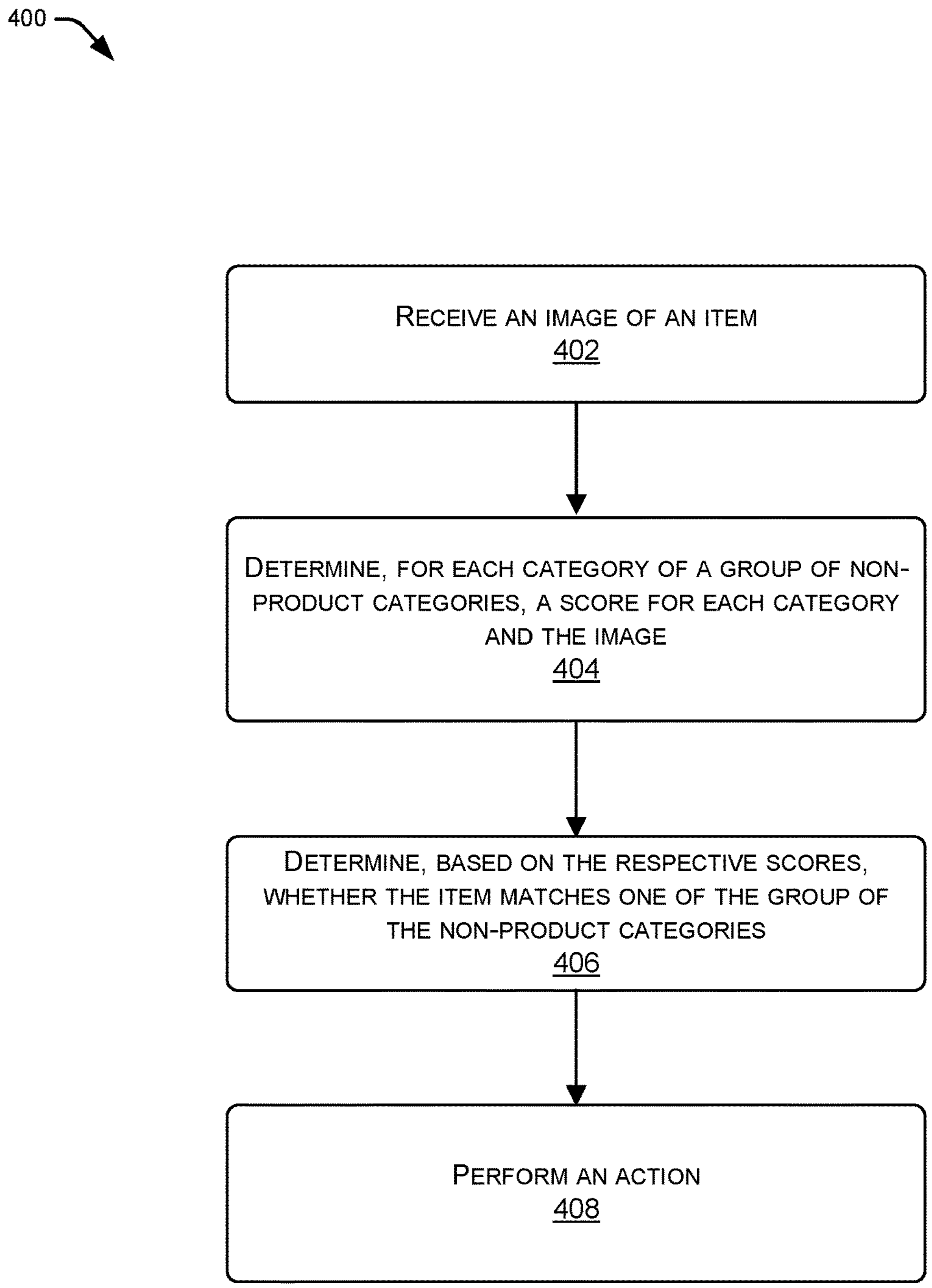
FIG. 4 illustrates example operations that can be performed in connection with non-product detection using a dual-pathway model, according to at least one example.

FIGS. 3 and 4 illustrate example processes that can be performed by a mobile apparatus 106 and/or a servers in order to perform non-product detection using a dual-pathway model, according to at least one example. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 3 illustrates an example process 300 for non-product detection using a registration-based pathway of a dual pathway model. In some examples, the process 300 can be performed during a session of a user, such as when the user places an item into the mobile apparatus 106. In some examples, the process 300 can be performed following the process 400 of FIG. 4. In some examples, process 300 can be performed simultaneously with process 400 of FIG. 4. In some examples, process 300 can be performed independently of process 400 of FIG. 4.

At 302, the process includes receiving a first sequence of images associated with an item. In some examples, the first sequence of images can include a single image. For example, the mobile apparatus can collect data and send the collected data to a server of the store. In some examples, the first sequence of images is generated by sensors of the mobile apparatus. In some examples, the first sequence of images is captured by the sensors in response to an event. In some examples, the mobile apparatus can collect the data and send the data to a non-product detection system of the mobile apparatus. The first sequence of images may be received in response to determining that an item is placed into the mobile apparatus and/or the item is determined to be a non-product item (e.g., a product identification system determines the item is not a product or does not include a barcode or other scannable code or identifier). In some examples, a virtual cart is generated in associated with the session. For instance, the virtual cart can be generated at the start of a session and may be associated with the session and the user identifier. The virtual cart may store indications of product items (e.g., such as product identifiers) placed in the mobile apparatus by a user for purchase.

At 304, the process 300 includes determining a personal item is registered as a non-product item in association with a user identifier. For instance, the process 300 may include determining a registration status associated with the user identifier. The registration status may indicate whether any personal items are registered as non-product items in association with the user. For example, where a user requests to register an item as a registered non-product item (e.g., such as at the beginning of a session), the process 300 can include registering the item, such as via operations 202-208 of FIG. 2A.

At 306, the process 300 includes accessing a second sequence of images of the registered non-product item. For instance, the second sequence of images may be retrieved from a personal gallery, such as personal gallery 202. In some examples, the process 300 can include accessing image features, such as image features 208, associated with the second sequence of images.

At 308, the process 300 includes determining similarity scores of the first sequence of images and the second sequence of images. For instance, determining the similarity scores may comprise applying a multi-modal vision and vision model.

At 310, the process 300 includes determining, based on the similarity scores, that the item matches the registered non-product item. For example, the process may compare the similarity scores (or a representative score) to a threshold. Where the similarity scores as greater than the threshold, the process 300 may determine that the item matches the registered non-product item.

At 312, the process 300 includes performing an action. For instance, the action may include storing the second sequence of images of the registered non-product item in associated with a user identifier. In some examples, the second sequence of images is stored for a duration of a session associated with the user identifier. In some examples, the process 300 can include refraining from adding the registered non-product item to the virtual shopping cart.

In some examples, the action may comprise performing a checkout process on product items(s) stored in the virtual shopping cart. For instance, after the user has ended their shopping session, the list of item identifiers in the virtual shopping cart may be uploaded to one or more remote servers, over one or more networks, that manage user accounts for users. The server(s) may charge the appropriate user account for the listing of the product items in the virtual shopping cart that the user took from the store. For instance, the server(s) may be configured to determine or generate information indicative of a cost of the items picked by the user. Additionally, the server(s) may store payment information (e.g., credit card information, bank account information, etc.) for each user account.

In some examples, the process 300 can include determining that the similarity scores do not match the registered non-product item. In this example, the process 300 can include determining that the item is similar to a product item offered by the store. In this example, the action can include generating an alert requesting identification of the non-product item. For example, the mobile apparatus may generate and display an alert to the user requesting input identifying the item as a personal item or not. The mobile apparatus may receive input indicating the non-product item is a second personal item. In this example, the process 300 can include refraining from registering the item as a second registered non-product item. Instead, the process 300 can include receiving heuristic data associated with the session and determining based on the heuristic data whether the item is the second personal item. Where the heuristic data indicates the item is the second personal item, the process 300 can include registering the item as the second personal item. Where the heuristic data indicates that the item is not the second personal item, the process 300 can include performing an additional action (e.g., generating an alert to the user, generating an alert to a store associate, performing an audit, requiring assistance at checkout, etc.).

FIG. 4 illustrates an example process 400 for non-product detection using a category-based pathway of a dual pathway model. In some examples, the process 400 can be performed during a session of a user, such as when the user places an item into the mobile apparatus 106. In some examples, the process 400 can be performed following the process 300 of FIG. 3. For example, where a user has registered personal items and the process 300 determines that the non-product item does not match a registered non-product item, process 400 may be performed. In some examples, process 400 can be performed simultaneously with or separately from process 300 of FIG. 3. For example, where a user does not register personal items at the start of a session, during the session when an item is placed into the mobile apparatus 106, process 400 and/or the operations of FIG. 2B may be performed.

At 402, the process 400 can include receiving an image of an item. In some examples, the image can include a sequence of images. In some examples, the image is generated by sensors for the shopping cart. For instance, the process 400 can receive the image in response to an event during a session associated with a user identifier. The user identifier may correspond to a user and the session may correspond to a shopping session. In some examples, a virtual cart is generated in associated with the session. For instance, the virtual cart can be generated at the start of a session and may be associated with the session and the user identifier. The virtual cart may store indications of product items (e.g., such as product identifiers) placed in the mobile apparatus by a user for purchase. The event can be detected during the session, such as when a user places an item into the mobile apparatus. In some examples, the event may comprise the process 400 determining that an item placed in the mobile apparatus is a non-product item. In some examples, the image may comprise query image(s) 212 or 228. In some examples, the image of the item is generated via the shopping cart equipped with a non-product detection system.

At 404, the process 400 can include determining, for each category of a group of non-product categories, a score for each category and the image. Where the image comprises a sequence of images, the process 400 can determine a respective matching image of the sequence of images and a respective score. In some examples, the group of non-product categories may comprise images and associated text for each of the categories. For instance, the group of non-product categories may be pre-defined and customized for a particular store. In some examples, the process 400 may access the group of non-product categories from a database associated with the store and/or memory of the mobile apparatus 106. In some examples, a multi-modal vision and language model is applied to perform matching of each of the non-product categories to the image and generation of the respective scores.

In some examples, the group of non-product categories may be generated based on receiving non-product images of non-products of a particular store, receiving non-product category information associated with the non-product images. For each of the non-product images, the process 400 may determine, a respective matching non-product category by applying a multi-modal vision and language model to match each of the non-product categories to a respective matching non-product image of the non-product images. The process 400 may store features (e.g., query features 234, text features, 242, weighted features 244, etc.) of each of the non-product images and the respective non-product categories to enable matching of the item to one of the non-product categories. In some examples, the respective scores comprise output 246.

At 406, the process can include determining, based on the respective scores, whether the item matches a category of the group of the non-product categories. For instance, each of the respective scores can be compared to a threshold. Where at least one of the respective scores is greater than the threshold, the process 400 can determine that the item matches one of the groups of the non-product categories.

In some examples, the process 400 may determine a representative score of the respective scores, where the representative score comprises one of a global score, a mean score, or a maximum score. In this example, the process 400 can compare the representative score to a threshold and determine whether the representative score is greater than the threshold.

At 408, the process 400 includes performing and action. For instance, the process 400 can store an indication that the item matches a non-product category for a duration of the session in association with the user identifier. The process 400 can also include refraining from adding the item to the virtual shopping cart of the user.

Where the respective scores are equal to or less than the threshold, the process 400 can determine that the item does not match one of the groups of the non-product categories. In this example, the action may comprise generating an alert. The alert may request input associated with the item. For instance, the input may be associated with identification of the item, registering the item as a registered non-product item, monitoring heuristic data, generating an alert for store associates, initiating an audit, or any other action described herein.

In some examples, the action may comprise performing a checkout process on product items(s) stored in the virtual shopping cart. For instance, after the user has ended their shopping session, the list of item identifiers in the virtual shopping cart may be uploaded to one or more remote servers, over one or more networks, that manage user accounts for users. The server(s) may charge the appropriate user account for the listing of the product items in the virtual shopping cart that the user took from the store. For instance, the server(s) may be configured to determine or generate information indicative of a cost of the items picked by the user. Additionally, the server(s) may store payment information (e.g., credit card information, bank account information, etc.) for each user account.

Figure 5:
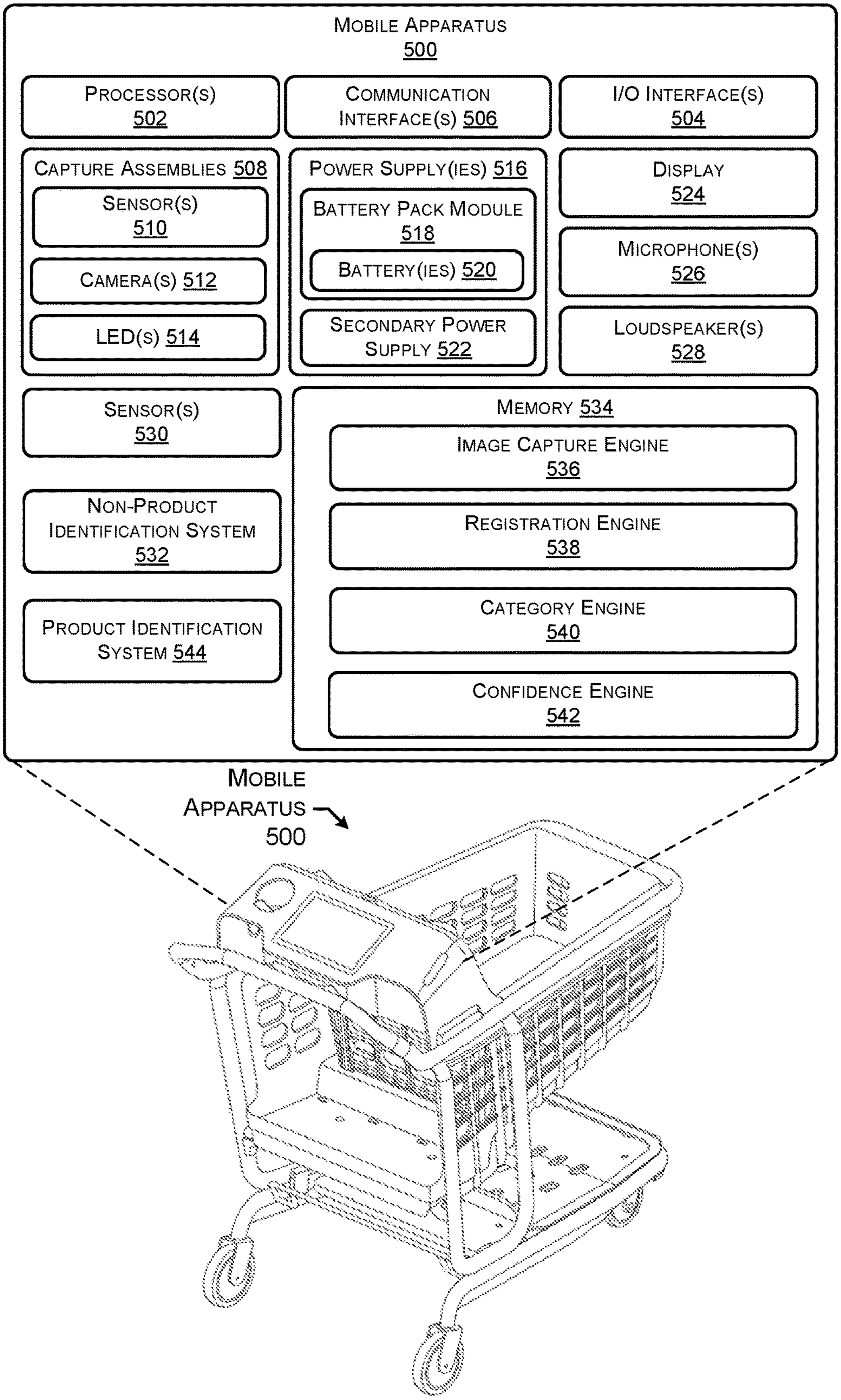
FIG. 5 illustrates a mobile apparatus in the form of a smart shopping cart, according to at least one example.

FIG. 5 illustrates a mobile apparatus in the form of a smart shopping cart, according to at least one example. The mobile apparatus 500 can implement the mobile apparatus 106 introduced in FIG. 1 in some embodiments. The mobile apparatus 500 may include one or more hardware processors 502 configured to execute one or more stored instructions. The processors 502 may comprise one or more cores. The mobile apparatus 500 may include one or more input/output (I/O) interface(s) 504 to allow the processors 502 or other portions of the mobile apparatus 500 to communicate with other devices. The I/O interface(s) 504 may comprise Inter-Integrated Circuit (I2C), Serial Peripheral Interface bus (SPI), Universal Serial Bus (USB) as promulgated by the USB Implementers Forum, and so forth. The I/O interface(s) 504 may allow the various modules/components to communicate with each other and/or control each other.

The mobile apparatus 500 may also include one or more communication interfaces 506. The communication interface(s) 506 are configured to provide communications between the mobile apparatus 500 and other devices, such as the server(s), sensors, interface devices, routers, and so forth associated with the store 112. The communication interface(s) 506 may include devices configured to couple to personal area networks (PANs), wired and wireless local area networks (LANs), wired and wireless wide area networks (WANs), and so forth. For example, the communication interfaces 506 may include devices compatible with Ethernet, Wi-Fi™, and so forth. The mobile apparatus 500 may also include one or more busses or other internal communications hardware or software that allow for the transfer of data between the various modules and components of the mobile apparatus 500.

The mobile apparatus 500 may also include the one or more capture assemblies 508 that each include one or more sensors 510, cameras 512, and LEDs 514. In some examples, the sensor(s) 510 may comprise any type of sensor that is able to detect the presence of nearby objects without the need for physical contact (e.g., ToF sensor(s), PIR sensor(s), capacitive sensor(s), etc.). The cameras 512 in each of the capture assemblies 508 may comprise any type of camera or imaging device configured to generate image data (and/or video data), or information descriptive of a plurality of picture elements or pixels. The LED(s) 514 may be selectively activated to emit light at any wavelength, visible or non-visible to users. In some examples, one or more capture assemblies 508 may additionally, or alternatively, be facing downward into the basket or receptable of the mobile apparatus 500. The mobile apparatus 500 can use such downward facing cameras 512 to collect sequence(s) of images of items placed into the mobile apparatus 500 for use in non-product detection.

Additionally, the mobile apparatus 500 may include one or more cameras 512 that are outward facing and can therefore generate image data representing the store around the mobile apparatus 500. The mobile apparatus 500 can use such outward facing cameras 512 to collect product images, location information, and/or other heuristic data.

The mobile apparatus 500 may include one or more power supply (ies) 516 to provide power to the components of the mobile apparatus 500, such as a battery pack module 518 which can include one or more batteries 520. The power supply (ies) 516 may also include a secondary (e.g., internal) power supply 522 to allow for hot swapping of battery pack modules 518, such as one or more capacitors, internal batteries, etc.

The mobile apparatus 500 may also include a display 524 configured to display content represented by image data, such as pictures, videos, user interface elements, and/or any other image data. The display 524 may comprise any type of display, e.g., a touch screen adapted to receive touch input from a user. The mobile apparatus 500 may also include one or more microphones 526 and one or more loudspeaker(s) 528 to facilitate a dialogue with a user, and/or to receive feedback from the user. The microphone(s) 526 may capture sound representing the user's speech, and the loudspeaker(s) 528 may output machine-generated words to facilitate a dialogue, prompt a user for feedback on an item and/or for other information, and/or output other alerts or notifications.

The mobile apparatus 500 can be adapted to receive non-product registration requests via the display 524 and/or the microphones 526. The mobile apparatus 500 can send received non-product registration requests to server(s) of the store 112 and/or process the non-product registration requests at the mobile apparatus 500. The mobile apparatus 500 can be adapted to generate and provide alerts to the user via the display 524 and/or the loudspeaker(s) 528.

The mobile apparatus 500 may also include other types of sensor(s) 530. As described herein, these sensor(s) may comprise proximity sensor(s), location sensor(s), light sensor(s), and/or the like.

The mobile apparatus 500 may also include a non-product identification system 532. The non-product identification system 532 can be adapted to collect and record non-product information of items placed inside the mobile apparatus 500, in order to facilitate identification and monitoring of non-product items. The non-product identification system 532 can communicate with other equipment or devices within the store, such as devices of store associates, server(s), etc.

The mobile apparatus 500 may also include a product identification system 544. The product identification system 544 can be adapted to collect and record product identification information of products placed inside the mobile apparatus 500, in order to facilitate purchase of products. The product identification system 544 can optionally accept and process payments, or can communicate with other payment processing equipment, e.g., upon checkout.

The mobile apparatus 500 may include one or more memories, such as the memory 534. The memory 534 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 534 provides storage of computer-readable instructions, data structures, program modules, and other data for the operation of the mobile apparatus 500.

The mobile apparatus 500 may include an image capture engine 536, a registration engine 538, a category engine 540, and a confidence engine 542 as part of the memory 534. The image capture engine 536 may include one or more systems, techniques, algorithms, models, or other such information that may be used to capture sequence(s) images of items, provide the sequence(s) of images to the product identification system 544, non-product identification system 532, registration engine 538, category engine 540, and/or server(s) 700. The registration engine 538 may include one or more systems, techniques, algorithms, models, or other such information that may be used to perform registration-based non-product detection. For instance, the category engine 540 may be configured to perform one or more operations of FIG. 2A, according to at least one example. The category engine 540 may include one or more systems, techniques, algorithms, models, or other such information that may be used to perform category-based non-product detection. For instance, the category engine 540 may be configured to perform one or more operations of FIG. 2B, according to at least one example. The confidence engine 542 may include one or more systems, techniques, algorithms, models, or other such information that may be used to generate and output similarity scores, determine whether the similarity scores are greater than a threshold, determine whether an item is a non-product item, a registered non-product item, a non-product item corresponding to a group of non-product categories, and/or cause an action to be performed. For instance, the confidence engine 540 can be configured to perform one or more operations of FIG. 2A and/or FIG. 2B, according to at least one example.

Figure 6:
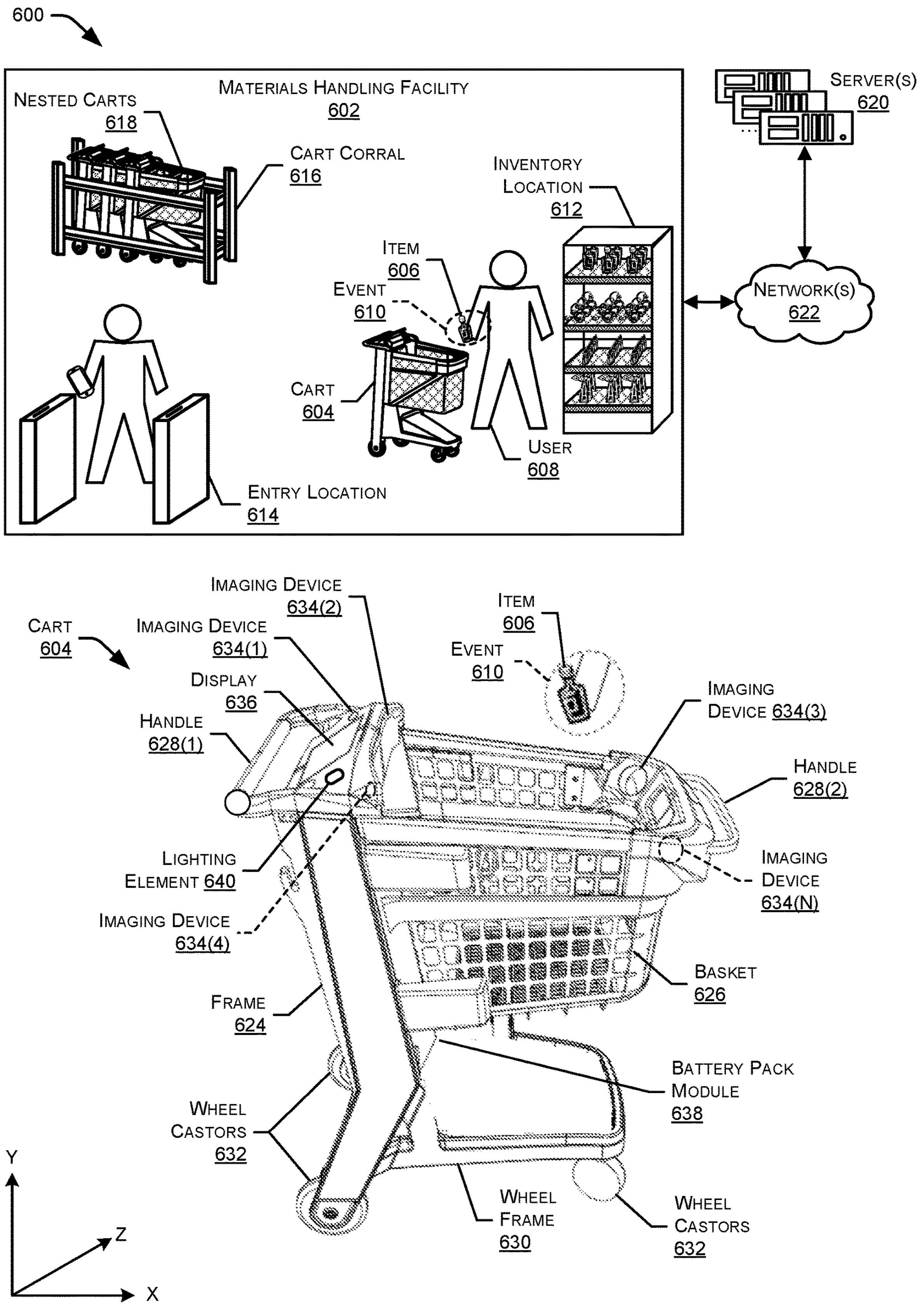
FIG. 6 illustrates an example environment of a materials handling facility that includes smart shopping cart, according to at least one example.

FIG. 6 illustrates an example environment 600 of a materials handling facility 602 that includes smart shopping cart 604. The cart 604 may perform non-product detection in order to identify items 606 placed in, and removed from, a basket of the cart 604 by an example user 608. In some instances, the facility 602 may correspond to store 112. In some instances, the cart 604 corresponds to the mobile apparatus 106 described above. In some instances, items 606 correspond to items 104. In some instances, user 608 corresponds to user 102. In some instances, the cart performs non-product detection in response to an event 610 involving the item (e.g., add to cart, remove from cart, multiple items, quantity of items, etc.). In some instances, the event 610 corresponds to event 110. In some instances, the cart 604 is configured to perform any of the operations described in FIGS. 1-5.

As FIG. 6 depicts, the user 608 may have engaged in a shopping session in the materials handling facility 602. For instance, the user 608 may have selected an item 606 from an inventory location 612 (e.g., shelf, aisle, etc.) and placed the item 606 in the cart 604 (e.g., shopping cart). The inventory location 612 may house one or more different types of items 606 and the user 608 may pick (i.e., take, retrieve, etc.) one of these items 606. In some examples, the user 608 can place an item 606, such as a non-product item (e.g., personal item) into the cart 604, as described above with regard to FIGS. 1-5.

As illustrated, the materials handling facility 602 (or "facility") may have one or more entry locations 614, such as lanes. The entry location 614 may be defined by a gate in some examples and may include a movable barrier to control movement of users 608. For example, the gate may include computer-controlled panels that may be closed to impede passage of the users 608 or opened to permit passage of the user 608. Upon entering a facility 602, a user 608 may desire to utilize a cart 604 for their shopping session to transport items 606 around the facility 602 during their shopping session. In such examples, the user 608 may approach a cart corral 616, or other locations, at which carts 604 are stored. In some examples, the cart corral 616 may comprise a structure, such as an aisle, for storing nested carts 618.

Generally, two or more of the carts 604 may be configured to nest or otherwise functionality join with one another, so that the carts 604 may be easily stored in a cart corral 616, and/or transported in bulk. In some examples, the cart corral 616 may provide additional functionality beyond storage. For instance, the cart corral 616 may facilitate charging of the nested carts 618 that are in the cart corral 616. For instance, the cart corral 616 may have various electrical contacts extending along the length of a horizontal and/or vertical member of the corral 616 that, when placed in electrical contact with an electrical contact of the nested carts 618, charge one or more batteries of the nested carts 618. In other examples, power cords may extend from the cart corral 616 that may be plugged into the nested carts 618 to recharge batteries of the nested carts 618 while not in use.

In some instances, as described above, each of the nested carts 618 may reside in a low-power (e.g., deep-sleep) state when in the cart corral 616. For instance, proximity sensors of the cart may detect an object (e.g., another cart) very near and, in response, may cause the respective cart to enter the low-power state. In addition, or in the alternative, each cart may include a mechanical switch that may be actuated when placed into the cart corral 616, resulting in the cart entering the low-power state. In still other instances, when the cart corral 616 includes the electrical contacts to contact with corresponding contacts of the nested carts 618, each cart may use this signal to cause the cart to enter the low-power state. Of course, while a few examples are provided, the carts may enter the low-power state in any number of ways when nested with other carts in the corral 616.

To utilize a cart 604, a user 608 may approach an unused cart that is not currently engaged in a shopping session (e.g., a nested cart 618), and interact with the unused cart 604 to identify themselves to the cart 604 and begin a shopping session. For instance, the carts 604 may include a first imaging device 634(1) (e.g., an image sensor such as a camera, photodetector, or other sensing apparatus designed to read a one or two-dimensional barcode) such that when a user 608 presents a user device, or portion thereof, such as the display, to the imaging device 634(1), the cart 604 may identify the user and corresponding user account for a shopping session. Other types of interaction may be performed by a user 608 to identify themselves to a cart 604 (e.g., uttering a name or other keyword to identify the user 608, presenting the user's face for facial recognition, typing in a password or other user information into a display of the cart 604, and/or any other type of user identification technique).

Further, in some instances the cart 604 may transition from a low-power state to a higher-power state in response to the user approaching the cart 604 and/or removing the cart 604 from the corral 616. For instance, the imaging devices 634 and/or the proximity sensors may identify the user approaching (e.g., entering within the threshold distance of the cart 604) and, in response, may cause the cart to enter the higher-power state by, for example, powering on and/or up one or more components that were previously powered off and/or down. In another example, removing the cart 604 from the corral 616 may cause the mechanical switch to trip or may cause the electrical contacts of the corral 616 to become uncoupled from the contacts of the cart 604, resulting in the cart entering the higher-power state. Again, while a few examples are provided, it is to be appreciated that the cart may transition from a low-power state to a higher-power state in response to being removed from the corral 616 and/or in response to a user approaching the cart 604 in any number of other ways.

Once a user has identified themselves to the cart 604, the registration functionality may be activated such that the user 608 can register one or more personal items as non-product items for the shopping session, as described above with regard to FIGS. 1-5. Additionally, once a user has identified themselves to the cart 604, the item-identifying functionality of the cart 604 may be activated such that subsequent items 606 placed in the cart 604 will be identified by the cart 604 as product items or non-product items, with product items being added to a virtual shopping cart for the user 608. As illustrated, a user 608 may move the cart 604 around the facility 602 to one or more inventory locations 612. The user 608 may retrieve items from the inventory location 612 and place the items 606 in the cart 604. Additionally, the user 608 may retrieve items 606 from the cart 604 and put the items 606 back in an inventory location 612, such as when the user 608 changes their mind regarding their desire to purchase or otherwise acquire the item 606. The cart 604 may include various components for identifying item identifiers corresponding to the items 606 placed in the cart and maintaining a virtual shopping cart for the shopping session of the user 608.

Once the user 608 has finished their shopping session, the user 608 may end the shopping session in various ways. For instance, the user 608 may return the cart 604 to the cart corral 616, provide input to the cart 604 indicating an end of the shopping session (e.g., utterance, utilize a user interface element on a touch display, etc.), or simply remove item bags or other item carriers from the cart 604 and leave the facility 602. After the user 608 has ended their shopping session, the list of item identifiers in the virtual shopping cart may be uploaded to one or more remote servers 620, over one or more networks 622, that manage user accounts for users 608 of the facility 602. The server(s) 620 may charge the appropriate user account for the listing of the items in the virtual shopping cart that the user took from the facility 602. For instance, the server(s) 620 may be configured to determine or generate information indicative of a cost of the items 606 picked by the user 608. Additionally, the server(s) 620 may store payment information (e.g., credit card information, bank account information, etc.) for each user account. In this way, when the user 608 finished their shopping session and the cart 604 sends the listing of item identifiers in the virtual shopping cart over the network(s) 622 to the server(s) 620, the server(s) 620 may be configured to determine a cost or price for all of the listed item identifiers, and charge the user via their payment information for the items 606 selected during their shopping session. In this way, the user 608 need not go through steps of a traditional check-out experience (e.g., waiting in line for a cashier, scanning items with the cashier, paying for items at the cashier, etc.).

The network(s) 622 may include private networks such as an institutional or personal intranet, public networks such as the Internet, or a combination thereof. The network(s) 622 may utilize wired technologies (e.g., wires, fiber optic cable, and so forth), wireless technologies (e.g., radio frequency, infrared, acoustic, optical, and so forth), or other connection technologies. The network(s) 622 is representative of any type of communication network, including one or more of data networks or voice networks. The network(s) 622 may be implemented using wired infrastructure (e.g., copper cable, fiber optic cable, and so forth), a wireless infrastructure (e.g., cellular, microwave, satellite, etc.), or other connection technologies.

The cart 604 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 622 according to the type of protocol or standard being used. As noted above, in some examples, the servers 620 may perform some or all of the operations described below as being performed by the cart 604. While the servers 620 are illustrated as being in a location outside of the facility 602, in other implementations, at least a portion of the servers 620 may be located at the facility 602.

As illustrated, the cart 604 may generally include or be formed of a frame 624, a basket 626, a first handle 628(1) for pushing the cart 604, a second handle 628(2) for pulling the cart, a wheel frame 630, and one or more wheel castors 632 to enable movement of the cart 604 on a surface. The frame 624, the basket 626, the handles 628, and the wheel frame 630 may be formed from any suitable materials such as plastics, wood, metals, composites, or any other combinations of materials. Moreover, frame 624, the basket 626, the handle 628, and the wheel frame 630 may take any form.

The basket 626 may generally be part of the frame 624 and/or supported by the frame 624 (e.g., be welded, fused, adhered, bolted, screwed, molded, or otherwise joined to the frame 624). In some examples, the basket 626 may comprise a grid or lattice-like structure (e.g., a honeycombed arrangement or framework) having one or more bars or members that are welded, fused, adhered, bolted, screwed, molded, stitched, or otherwise joined in a substantially perpendicular alignment with respect to one another. The basket 626 may generally be any shape that defines an interior cavity, or receptacle, for receiving items 606 that are placed in the cart 604. The basket 626 may comprise a bottom, multiple sides protruding from the bottom, and a top. As illustrated, the bottom basket 626 may be in the shape of a quadrilateral such that there are four sides protruding from the bottom of the basket 626. Similarly, the top of the basket 626 may be defined according to the quadrilateral shape and have a perimeter with four corners. The perimeter of the top of the basket 626 may define an opening to the interior cavity (or receptacle) of the basket 626 to receive items placed inside the basket 626. In various examples, the perimeter of the top of the basket may be disposed in a substantially horizontal plane (e.g., a plane substantially along the x-axis as illustrated), and the frame 624 may include at least one vertical member that extends downward from the basket 626 to the wheel frame 630 along a substantially vertical plane (e.g., a plane substantially along the y-axis as illustrated).

The wheel frame 630 may support one or more wheel castors 632 to enable movement of the cart 604 along a surface. The wheel casters 632 include one or more wheels, axles, forks, joints, or other components which enable the cart 604 to travel on various surfaces. For example, in some implementations each of the wheel casters 632 may include a single wheel provided on an axle within a fork, or two or more wheels provided on such an axle. In some other implementations, the wheel casters 632 may include two or more axles. Alternatively, in still other implementations, a single caster may be provided in lieu of the multiple wheel casters 632 shown in FIG. 6. In accordance with the present disclosure, the wheel casters 632 may operate in any manner, such as being configured to pivot or swivel, and thus automatically adjust or align with a direction of travel. In some examples, the cart 604 may be equipped with other apparatuses for enabling the cart 604 to travel on solid surfaces, including one or more wheeled components other than casters, including but not limited to omnidirectional wheels, spherical wheels, or other like apparatuses. Additionally, in some other implementations, the cart 604 may include two or more skis or other runners for traveling on smooth surfaces. In still other implementations, the cart 604 may be levitated, e.g., by magnetic levitation through the use of one or more linear induction motors. Moreover, the cart 604 may be propelled or pushed by humans or autonomous mobile robots or, alternatively, by one or more motors (e.g., electric-powered, or gasoline-powered).

As illustrated, the cart 604 may include a first imaging device 634(1), for identifying a user operating the cart as described above, and additional, second imaging devices 634(2), 634(3), 634(4) . . . , 634(N) that include components for use in identifying items placed in the basket 626 and removed from the basket 626. The imaging device 634(1) may, in some instances, be positioned in a manner such that an FOV of the imaging device 634(1) is away from the basket 626 and substantially towards the first handle 628(1) where a user may typically operate the cart 604. The imaging devices 634(2)-(N) may be positioned at any location on the cart 604 (e.g., in the basket 626, on the basket 626, mounted to the frame 624, mounted to the basket 626, and/or any other location), oriented to have respective FOVs for identifying events that occur within and proximate to the basket 626. In some examples, the cart 604 may include at least four of the second imaging devices 634(1), 634(2), 634(3), and 634(N) that are disposed or coupled proximate to four corners of the top of the basket 626. In some examples, one or all of the components of the second imaging devices may be disposed internal to the form factor of the basket 626 and/or frame 624, at least partially internal to the form factor of the basket 626 and/or frame 624, and/or entirely external to the form factor of the basket 626 and/or frame 624 (e.g., mounted to the cart 604). However, in the illustrated example, the second imaging devices may be disposed at locations proximate to the four corners of the top or perimeter of the basket 626/frame 624. In some instances, the less that the second imaging devices protrude from the form factor of the cart 604, the more efficiently the carts 604 may be nested with respect to each other.

The cart 604 may further include one or more one light sources (e.g., LED) for emitting light at or prior to the time of the second imaging devices generating the second image data. The cart 604 may further include, in some instances, one or more proximity sensors (e.g., ToF sensor, PIR sensor, etc.). In some examples the proximity sensors may be activated to detect the proximity of users, objects above the top of the basket 626, and/or other objects. The proximity sensors may be configured to generate sensor data that indicates distances between objects above the top of the basket 626 of the cart 604 and the second imaging devices. The cart 604 may include components configured to analyze the sensor data and determine that an item 606 is within some threshold distance from the top of the basket 626 and/or within the basket 626. Upon detecting an object within the threshold proximity of the basket 626 using the proximity sensor, one or more components of the cart 604 may cause the light sources (LEDs) to emit light and the second imaging devices to generate image data. In some examples, the FOVs of the second imaging devices 634(2)-(N) may each at least partially overlap at a location above the top of the basket 626 corresponding to a centroid of the quadrilateral defining the top of the basket 626. The light sources may illuminate the basket 626 and/or the area above the top of the basket 626 to illuminate items 606 being placed in the cart 604, or removed from the cart 604, to act as a "flash" for the cameras that are generating image data. The second imaging devices may generate image data for a predefined period of time and/or until the proximity sensors (or the image data itself) indicates that there is no longer an object within the threshold distance from the cart 604 or top of the cart 604. After generating the image data, one or more components of the cart 604 may process the image data to determine an item identifier for the item(s) 606 represented in the image data, and an event 610 for the image data (e.g., addition of an item 606 to the cart, removal of an item 606 from the cart). As described in more detail below, the cart 604 may include component(s) to determine an item 606 identifier for the item 606 (e.g., name of the item 606, SKU number for the item 606, non-product classification or product classification, etc.), and determine if the item 606 is being taken from the cart 604, or added to the cart 604, based on the motion of the item 606 and the result of the movement around the cart 604 once movement is no longer detected and represented by the image data. The components of the cart 604 may then update a virtual shopping cart associated with the cart 604 that indicates a virtual listing of items 606 taken by the user 608 from the facility based on the determined event 610. In some examples, the image data may be transmitted to the server(s) 620 over the network(s) 622 where the processing may be performed.

In various examples, the cart 604 may include a display 636 to present various information in user interface(s) for the user 608 to consume. In some examples, the display 636 may comprise a touch screen to receive input from the user 608 (e.g., a selection of an item identifier to disambiguate amongst potential item identifiers, a selection of whether an item is a non-product item or not, etc.). In some instances, the display 636 may present customized information to the user 608 upon identifying the user 608, such as a shopping list of the user or the like. In addition, the display 636 may present the alerts or requests to register personal item(s), as described above with regard to FIGS. 1-5.

The cart 604 may further include a battery pack module 638 that houses one or more batteries to power the components of the cart 604. The battery pack module 638 may include rechargeable batteries. In some examples, the battery pack module 638 may be detachably coupled to the wheel frame 630 and/or the frame 624 of the cart 604 such that the battery pack module 638 may be removed and taken to a charging station. In various examples, the battery pack module 638 may include rechargeable batteries that may be charged when the cart 604 is placed in a cart corral 616 (e.g., through electrical contacts, power cords, etc.). In various examples, the frame 624 and/or basket 626 may have one or more channels (e.g., grooves, holes, paths, tunnels, etc.) through which power cables/cords may pass. In this way, power cables may be run at least partially through the channels in the frame 624 and/or basket 626 inconspicuously to provide power to the various components of the cart 604.

In some instances, the cart 604 may further include one or more lighting element(s) 640 disposed on the frame 624 and/or basket 626 of the cart 604. The user 608 may, in some instances, operate a controller to turn on (and off) the lighting element(s) 640 to cause the lighting element(s) to emit light. Further, in some instances the controller may enable the lighting element(s) 640 to transition between multiple light states, such as different colors, flashing effects, and/or the like. The controller operable by the user 608 may comprise functionality accessible to the user 608 via the display (e.g., one or more soft buttons for turning on and/or off the light), a physical toggle switch on the frame 624 of the cart 604, and/or the light. Further, the lighting element(s) 640 may be used to signal a predefined state of the cart 604 and/or the user 608. For example, the user 608 may turn on the lighting element(s) 640 to indicate that he or she requests assistance from an associate of the facility 602, or for any other reason. In some instances, in response to the user 608 operating a controller to request assistance, the cart 604 may perform one or more actions in addition to turning on the lighting element(s) 640. For example, the display may present content responding to this request, such as an offer to connect the user 608 with an associate of the store (e.g., in person, via I/O devices of the cart, etc.). For example, in response to requesting assistance, the cart 604 may facilitate an audio-only or an audio/video call between the user 608 and an associate of the facility using one or more I/O devices on the cart, such as the display, one or more speakers, one or more microphones, one or more cameras pointed toward the user 608 and/or the like.

In still other instances, associates of the facility may, remotely or otherwise, operate the lighting element(s) 640 to change states (e.g., turn on or off) and/or the cart 604 may include components to automatically change a state of the lighting element(s) 640. For example, upon the card identifying that an item of a predefined class of items has entered the basket, the cart 604 may cause the lighting element(s) 640 to change state (e.g., from an off state to an on state) to indicate that an additional checkout workflow may now be required. For example, if the user 608 places an item into the basket 626 that requires the purchasing user to be of a certain age (e.g., alcohol) or to have a certain prescription (e.g., medicine), the cart 604 may illuminate the lighting element(s). In some instances, the cart 604 may include a lighting element on a right side of the frame, a lighting element on a left side of the frame, and/or one or more other lighting elements in other locations on the cart 604.

Figure 7:
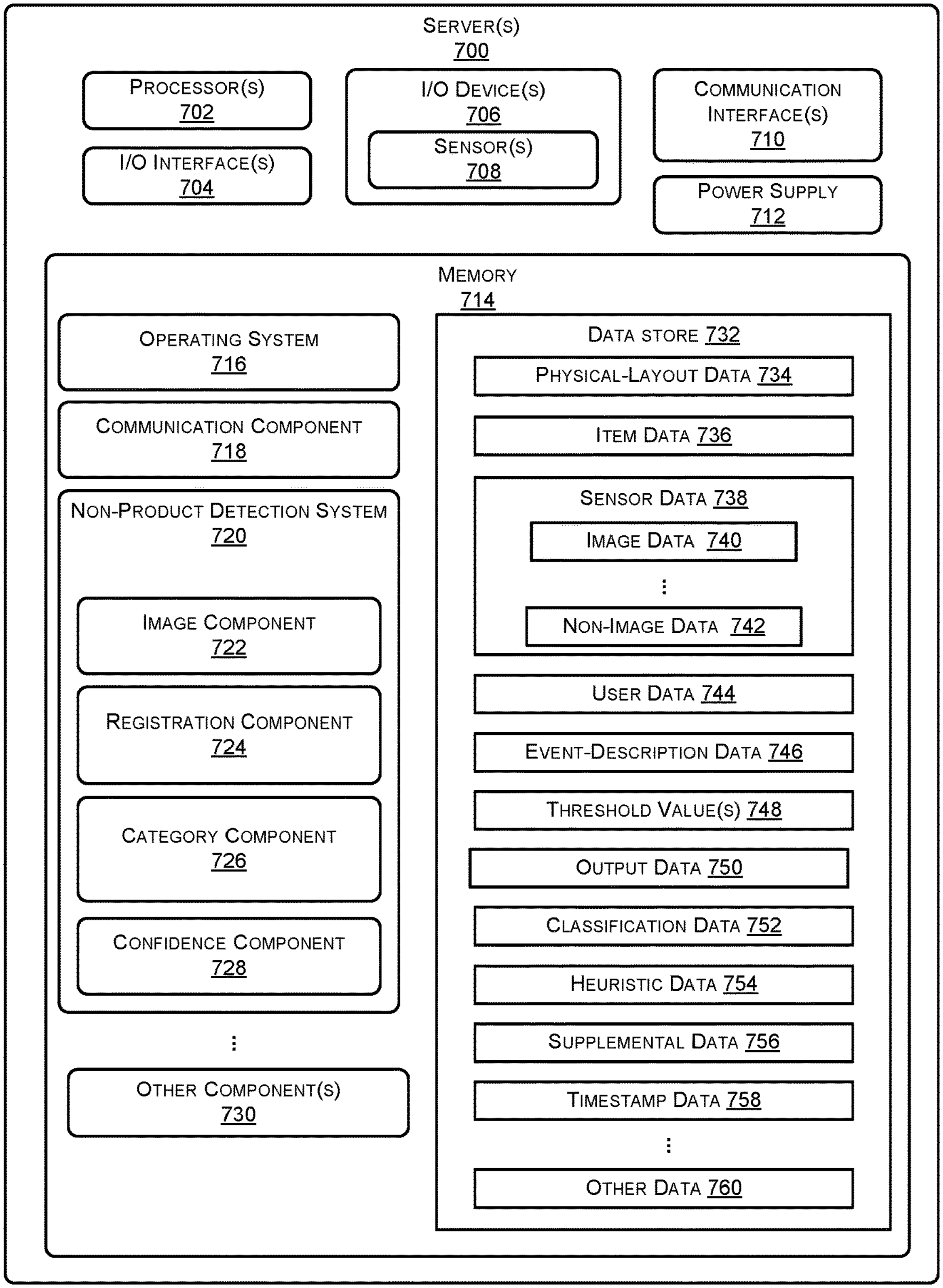
FIG. 7 illustrates a block diagram of one or more server devices configured to support non-product detection, according to at least one example.

FIG. 7 illustrates a block diagram of the one or more servers 700. The servers 700 may be physically present at a facility, such as store 112 or facility 602, may be accessible by the network 622, or a combination of both. The servers 700 do not require end-user knowledge of the physical location and configuration of the system that delivers the services. Common expressions associated with the servers 700 may include "on-demand computing," "software as a service (SaaS)," "cloud services," "data centers," and so forth. Services provided by the servers 700 may be distributed across one or more physical or virtual devices.

The servers 700 may include one or more hardware processors 702 (processors) configured to execute one or more stored instructions. The processors 702 may comprise one or more cores. The servers 700 may include one or more input/output (I/O) interface(s) 704 to allow the processor 702 or other portions of the servers 700 to communicate with other devices. The I/O interfaces 704 may comprise Inter-Integrated Circuit (I2C), Serial Peripheral Interface bus (SPI), Universal Serial Bus (USB) as promulgated by the USB Implementers Forum, and so forth. FIG. 7 also illustrates I/O devices 706.

The servers 700 may also include one or more communication interfaces 710. The communication interfaces 710 are configured to provide communications between the servers 700 and other devices, such as the sensors 708, the interface devices, routers, and so forth. The communication interfaces 710 may include devices configured to couple to personal area networks (PANs), wired and wireless local area networks (LANs), wired and wireless wide area networks (WANs), and so forth. For example, the communication interfaces 710 may include devices compatible with Ethernet, Wi-Fi™, and so forth. The servers 700 may also include one or more busses or other internal communications hardware or software that allow for the transfer of data between the various modules and components of the servers 700.

The servers 700 may also include a power supply 712. The power supply 712 is configured to provide electrical power suitable for operating the components in the servers 700.

The servers 700 may further include one or more memories 714. The memory 714 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 714 provides storage of computer-readable instructions, data structures, program modules, and other data for the operation of the servers 700. A few example functional modules are shown stored in the memory 714, although the same functionality may alternatively be implemented in hardware, firmware, or as a system on a chip (SOC).

The memory 714 may include at least one operating system (OS) component 716. The OS component 716 is configured to manage hardware resource devices such as the I/O interfaces 704, the communication interfaces 710, and provide various services to applications or components executing on the processors 702. The OS component 716 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 714. These components may be executed as foreground applications, background tasks, daemons, and so forth. A communication component 718 may be configured to establish communications with one or more of the sensors 708, one or more of the devices used by associates, other servers 700, or other devices. The communications may be authenticated, encrypted, and so forth.

The memory 714 may store a non-product detection system 720. The non-product detection system 720 is configured to provide non-product detection functions as described above with regard to FIGS. 1-6.

The non-product detection system 720 may access information stored in one or more data stores 732 in the memory 714. The data store 732 may use a flat file, database, linked list, tree, executable code, script, or other data structure to store the information. In some implementations, the data store 732 or a portion of the data store 732 may be distributed across one or more other devices including other servers 700, network attached storage devices, and so forth.

The non-product detection system 720 may include one or more of an image component 722, registration component 724, category component 726, and confidence component 728, potentially amongst other components 730.

The image component 722 is configured to receive image(s) and identify item(s) in the image(s). In one implementation, the image component 722 may be configured to receive images from a mobile apparatus 500. In some examples, the image component may be configured to identify item(s) in the images, such as an item 104. In another implementation, the image component 722 may be configured to identify an identifier associated with the user 102. For example, the image component 722 may process the images and store features associated with the images as image data 740. The image component 722 may determine the identity data of the user 102 depicted in the images by comparing the characteristics in the image data 740 with previously stored results. The image component 722 may also access data from other sensors 708, such as from an RFID reader, an RF receiver, fingerprint sensors, and so forth. The image component 722 may process and store images of registered non-product items as image data 740. In some examples, features of the images may be stored as image data 740 or item data 736. In some examples, the image component 722 may be configured to perform some or all of the techniques described above with regards to the image capture engine 536 and/or the operations of FIGS. 1-6 described above. The image component 722 is configured to communicate with any other element shown in FIG. 7.

The registration component 724 is configured to register non-product items and perform registration-based non-product detection. The registration component 724 may access information stored in the data store 732 including, but not limited to, item data 736, threshold value(s) 748, image data 740, classification data 752, and heuristic data 754. In some instances, the registration component 724 is may be configured to perform some or all of the techniques described above with regards to the registration engine 538 and/or the operations of FIGS. 1-6. The registration component 724 is configured to communicate with any other element shown in FIG. 7.

The category component 726 is configured to access or generate a group of non-product category(ies) for a facility and perform category-based non-product detection. The category component 726 is configured to communicate with any other element shown in FIG. 7. The category component 726 may access information stored in the data store 732 including, but not limited to, item data 736, threshold value(s) 748, image data 740, classification data 752, and heuristic data 754. In some instances, the category component 726 is may be configured to perform some or all of the techniques described above with regards to the category engine 540 and/or the operations of FIGS. 1-6.

The confidence component 728 is configured to process the item data 736 and threshold value(s) 748, to generate output data 750 and/or classification data 752, and may include components described above. The confidence component 728 may access information stored in the data store 732 including, but not limited to, item data 736, threshold value(s) 748, image data 740, classification data 752, and heuristic data 754. In some instances, the confidence component 728 may be configured to perform some or all of the techniques described above with regards to the confidence engine 542 and/or the operations of FIG. 2A and/or 2B. In some examples, the confidence component 728 is configured to provide alerts to the user via I/O interface(s) 704. The confidence component 728 is configured to communicate with any other element shown in FIG. 7.

In some examples, the other component(s) 730 may comprise additional systems. For instance, the other component(s) 730 may include a product identification system, which may be configured to access data store 732 in order to determine whether an item is a product. The product identification system may be configured to perform some or all of the techniques described herein with regards to the product identification system 544.

The data store 732 may include physical layout data 734. The physical layout data 734 provides a mapping of physical locations within the physical layout of devices and objects such as the sensors 708, inventory locations, and so forth.

The item data 736 comprises information associated with the items 104. The information may include information indicative of one or more inventory locations at which one or more of the items 104 are stored. The item data 736 may also include event data, SKU or other product identifier, price, quantity on hand, weight, expiration date, images of the item 104, detail description information, ratings, ranking, and so forth. Still, in some instances, the item data 736 may include device data that associated items with devices that are used to track the locations of the items within the facility 602.

The data store 732 may also include sensor data 738. The sensor data 738 comprises information acquired from, or based on, the one or more sensors 708. For example, the sensor data 738 may comprise 3D information about an object in a facility, such as facility 602. As described above, the sensors 708 may include an imaging device, which is configured to acquire one or more images. These images may be stored as the image data 740. The image data 740 may comprise information descriptive of a plurality of picture elements or pixels. Non-image data 742 may comprise information from other sensors 708, such as input from microphones, weight sensors, and so forth.

User data 744 may also be stored in the data store 732. The user data 744 may include identity data, information indicative of a profile, purchase history, location data, demographic data, and so forth. Individual users or groups of users may selectively provide user data 744 for use by the non-product detection system 720. The individual users or groups of users may also authorize collection of the user data 744 during use of the facility 602 or access to user data 744 obtained from other systems. For example, the user 102 may opt-in to collection of the user data 744 to receive enhanced services while using the facility 602.

In some implementations, the user data 744 may include information designating a user 102 for special handling. For example, the user data 744 may indicate that the user 102 has been associated with an increased number of errors or has indicated that an item, which is similar to a product item, is a personal item, however, the user 102 has not behaved as such. The non-product detection system 720 may be configured to use this information to apply additional scrutiny to the events 110 associated with this user 102. For example, events 110 that include an item 104 being similar to a product item sold by the facility 602, where the item 104 is not a registered non-product item of the user 102, heuristic data 754 and alerts may be provided to the associates for processing regardless of the determined level of confidence in the output data 750 as generated by the automated system.

The event-description data 746 comprises information indicative of one or more events 110. For example, the event-description data 746 may comprise predefined profiles that designate movement of an item 104 into or out of the mobile apparatus 500. The event-description data 746 may comprise a location associated with the event 110. The event-description data 746 may be manually generated or automatically generated. The event-description data 746 may include data indicative of triggers associated with events occurring in the facility 602. An event may be determined as occurring upon detection of the trigger. For example, sensor data 738 such as a change in weight from a sensor at an inventory location may trigger detection of an event of an item 104 being added or removed from the inventory location. In another example, the trigger may comprise an image of the user 102 reaching a hand toward the inventory location. In yet another example, the trigger may comprise two or more users approaching to within a threshold distance of one another.

The threshold value(s) 748 may comprise threshold(s) used by the confidence component 728 to determine whether an item is a registered non-product item, matches a category of a group of non-product categories, etc.

The output data 750 may comprise similarity score(s) generated by the confidence component 728 in association with registered non-product items, category(ies) of non-product items, feature(s) of images, etc.

The classification data 752 may comprise stored indications corresponding to whether the item 104 is a non-product item or a product item. The classification data may further comprise a list of non-product category(ies) generated for the particular facility 602.

The heuristic data 754 may comprise additional data corresponding to user behavior with regard to items in the mobile apparatus. For instance, the heuristic data 754 may comprise a counter that tracks the number of times a non-product item is removed from the mobile apparatus, a counter that tracks the number of times the non-product item is added to the mobile apparatus, a counter that tracks the number of similar items in the mobile apparatus, location information, etc.

The supplemental data 756 comprises information associated with the event 110 or that may be useful in interpreting the sensor data 738. For example, the supplemental data 756 may comprise previously stored images of the items 104. In another example, the supplemental data 756 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 740 during presentation to an associate.

In some instances, the servers 700 may further store the timestamp data 758, timestamp data 758 representing locations of users 102 over time, and other data 760. In some instances, the servers 700 may store and/or utilize other data 760.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method to detect non-product items in a shopping cart of a store, comprising:

receiving a first sequence of images of an item in response to an event during a session associated with a user identifier, the first sequence of images being generated by sensors of the shopping cart, wherein a virtual cart is generated in associated with the session;

determining a registration status associated with the user identifier;

based on determining that a personal item is registered in association with the user identifier, determining whether the first sequence of images matches a second sequence of images of a registered non-product item, wherein the determining comprises:

accessing the second sequence of images of the registered non-product item;

determining similarity of the first sequence of images to the second sequence of images, wherein the similarity is based on generating respective similarity scores for each respective image in the first sequence of images and respective features for each of the images in the second sequence of images;

determining, based on the respective similarity scores, that the first sequence of images matches the registered non-product item; and storing an indication that the item matches the registered non-product item;

based on determining that the personal item is not registered in association with the user identifier, determining, whether the item matches a non-product category of a group of non-product categories for the store, wherein the determining comprises:

retrieving the group of non-product categories of the non-product items;

determining, for each of the non-product categories, a respective matching image of the first sequence of images of the item, wherein the determining generates respective scores for each of the images in the first sequence of images and the respective non-product categories; and determining, based on the respective scores, that the item matches one of the non-product categories; and performing, during the session or at an end of the session, an action.

2. The method of claim 1, wherein the first sequence of images is received via the shopping cart equipped with a non-product detection system and a product identification system.

3. The method of claim 1, further comprising:
receiving non-product images of non-products of a particular store;
receiving non-product category information associated with the non-product images;
determining, for each of the non-product images, a respective matching non-product category, wherein the determining comprises applying a multi-modal vision and language model to match each of the non-product categories to a respective matching non-product image of the non-product images; and
storing features of each of the non-product images and the respective non-product categories to enable matching of the item to one of the non-product categories.

4. The method of claim 1, wherein a multi-modal vision and language model is applied to perform the determining of each of the non-product categories to the respective matching image of the first sequence of images, and wherein a multi-modal vision and vision model is applied to determine the similarity scores.

5. A method to detect non-product items in a shopping cart using a group of non-product categories, comprising:
receiving an image of an item, the image being generated by sensors of the shopping cart;
determining, for each category of the group of non-product categories, a similarity score for each category and the image;
determining, based on the respective similarity scores, that the item matches one of the categories of the group of the non-product categories by at least:
determining a representative similarity score of the respective similarity scores, the representative similarity score comprising one of a global similarity score, a mean similarity score, or a maximum similarity score;
comparing the representative similarity score to a threshold similarity score; and
determining the representative similarity score is greater than the threshold similarity score; and
performing an action.

6. The method of claim 5, wherein a multi-modal vision and language model is applied to perform matching of each of the non-product categories to the image and generation of the respective similarity scores.

7. The method of claim 6, wherein the multi-modal vision and language model is a contrastive language-image pre-trained model.

8. The method of claim 5, wherein the group of non-product categories comprises a pre-defined list of non-product categories customized for a particular store.

9. The method of claim 5, further comprising:
receiving a second image associated with a second item;
determining, for each category of the group of non-product categories, a second similarity score for each category;
determining, based on the respective second similarity scores, that the second item does not match one of the categories of the group of the non-product categories; and
requesting input associated with the second item.

10. The method of claim 5, wherein the image is captured in response to detecting an event that corresponds to one of the item being placed in the shopping cart during a session, the item being removed from the shopping cart during the session, or determining that the item placed in the shopping cart is not a product.

11. The method of claim 5, further comprising:
receiving non-product images of non-products of a particular store;
receiving non-product category information associated with the non-product images;
determining, for each of the non-product images, a respective non-product category, wherein the determining comprises applying a multi-modal vision and language model to match each of the non-product categories to the respective non-product images; and
storing feature data for each of the matching non-product images and the non-product categories to enable matching the item to one of the non-product categories.

12. The method of claim 5, wherein the action comprises one or more of performing a checkout process on one or more product items stored in a virtual shopping cart associated with the shopping cart, requesting input from a user, storing an indication that the non-product item matches a non-product category for a duration of a session, or refraining from adding the item to the virtual shopping cart.

13. A method for detecting a non-product item in a shopping cart, comprising:
receiving a first sequence of images associated with an item, the first sequence of images being generated by sensors of a shopping cart;
determining a personal item is registered as a registered non-product item in association with a user identifier;
accessing a second sequence of images of the registered non-product item;
determining similarity scores of the first sequence of images and the second sequence of images by at least:
determining a representative similarity score of the similarity scores, the representative similarity score comprising one of a global similarity score, a mean similarity score, or a maximum similarity score;
comparing the representative similarity score to a threshold similarity score; and
determining the representative similarity score is greater than the threshold similarity score;
determining, based on the similarity scores, that the item matches the registered non-product item; and
performing an action.

14. The method of claim 13, wherein the action comprises one or more of storing the second sequence of images of the registered non-product item in associated with the user identifier for a duration of a session, performing an audit associated with the session, requesting input associated with the item, monitoring heuristic data, or refraining from adding the item to a virtual shopping cart.

15. The method of claim 14, wherein the second sequence of images is stored for a duration of a session associated with the user identifier.

16. The method of claim 13, wherein determining the personal item is registered as the registered non-product item comprises:
receiving a request to register the personal item as the registered non-product item; and
registering the personal item, wherein registering comprises:
receiving the second sequence of images associated with the personal item;
generating features of the second sequence of images by applying a multi-modal vision and vision model; and storing the second sequence of images and the respective features in association with the user identifier.

17. The method of claim 13, wherein the respective similarity scores do not match the registered non-product item, the method further comprising:

requesting input associated with the item;

receiving the input indicating the item is a second personal item; and registering the item as the second personal item.

18. The method of claim 13, wherein the respective similarity scores do not match the registered non-product item, and wherein the item is similar to a product item, the method further comprising:

requesting input associated with the item;

receiving the input indicating the item is a second personal item;

receiving heuristic data associated with a session;

determining based on the heuristic data that the item is the second personal item; and registering the item as the second personal item.

19. The method of claim 13, wherein the respective similarity scores do not match the registered non-product item, and wherein the item is similar to a product item, the method further comprising:

requesting input associated with the item;

receiving the input indicating the item is a second personal item;

receiving heuristic data associated with a session;

determining based on the heuristic data that the item is the product item; and performing the action.

* * * * *